(12) United States Patent
Linga et al.

(10) Patent No.: US 10,089,246 B1
(45) Date of Patent: *Oct. 2, 2018

(54) ACCESS FILES

(71) Applicant: VERA, Palo Alto, CA (US)

(72) Inventors: Prakash Linga, San Jose, CA (US); Ajay Arora, Redwood City, CA (US); Vladimir Buzuev, Castro Valley, CA (US); Maurice C. Evans, Oakland, CA (US); Justin Sisley, Mountain View, CA (US)

(73) Assignee: VERA, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,021

(22) Filed: Mar. 19, 2018

Related U.S. Application Data

(63) Continuation of application No. 14/939,226, filed on Nov. 12, 2015, now Pat. No. 9,921,976.

(60) Provisional application No. 62/137,920, filed on Mar. 25, 2015.

(51) Int. Cl.
*H04L 9/32* (2006.01)
*G06F 12/14* (2006.01)
*H04L 9/08* (2006.01)
*G06F 21/60* (2013.01)
*G06F 21/62* (2013.01)
*H04L 29/06* (2006.01)
*G06F 17/30* (2006.01)
*G06F 21/00* (2013.01)

(52) U.S. Cl.
CPC .... *G06F 12/1408* (2013.01); *G06F 17/30011* (2013.01); *G06F 21/602* (2013.01); *G06F 21/62* (2013.01); *G06F 21/6209* (2013.01); *G06F 21/6272* (2013.01); *H04L 9/0816* (2013.01); *H04L 63/0428* (2013.01); *H04L 63/20* (2013.01); *G06F 21/6218* (2013.01); *G06F 2212/1052* (2013.01); *H04L 2209/24* (2013.01)

(58) Field of Classification Search
CPC ............. G06F 21/10; G06F 2221/0775; G06F 2221/2101; G06F 2221/2141; G06F 17/30707; G06F 21/6209; G06F 21/6218; H04L 63/08; H04L 63/102
See application file for complete search history.

(56) References Cited

U.S. PATENT DOCUMENTS 7,380,120 B1 * 5/2008 Garcia ................ G06F 21/6209 380/200
2002/0178271 A1 * 11/2002 Graham .............. G06F 21/6245 709/229

(Continued)

*Primary Examiner* — Gary S Gracia

(57) ABSTRACT

Data security access and management may require a server dedicated to monitoring document access requests and enforcing rules and policies to limit access to those who are not specifically identified as having access to the data. One example of operation may include selecting data to access via a user device, identifying a user profile associated with the user device, retrieving at least one user policy associated with the user profile, determining whether the user policy permits the user device to access the data, matching the user policy to a data policy associated with the data, receiving an encryption key at the user device, applying the encryption key to the data, and unwrapping the data from a wrapped data format to access the data.

20 Claims, 22 Drawing Sheets

(56) References Cited

U.S. PATENT DOCUMENTS

| | | | | |
|---|---|---|---|---|
| 2002/0178353 A1* | 11/2002 | Graham | ............... | H04L 51/30 |
| | | | | 713/151 |
| 2003/0182575 A1* | 9/2003 | Korfanta | ............... | G06F 21/602 |
| | | | | 726/26 |
| 2005/0183035 A1* | 8/2005 | Ringel | ............... | G06F 3/0481 |
| | | | | 715/811 |
| 2008/0037534 A1* | 2/2008 | Shina | ............... | H04M 3/4938 |
| | | | | 370/389 |
| 2009/0055924 A1* | 2/2009 | Trotter | ............... | G06F 21/6245 |
| | | | | 726/20 |
| 2009/0274300 A1* | 11/2009 | Tou | ............... | H04L 63/0428 |
| | | | | 380/255 |
| 2010/0146269 A1* | 6/2010 | Baskaran | ............... | G06F 21/10 |
| | | | | 713/165 |
| 2010/0268934 A1* | 10/2010 | Hinton | ............... | H04L 63/0428 |
| | | | | 713/152 |
| 2013/0198521 A1* | 8/2013 | Wu | ............... | G06F 21/6209 |
| | | | | 713/175 |
| 2013/0239192 A1* | 9/2013 | Linga | ............... | G06F 21/44 |
| | | | | 726/7 |
| 2014/0164441 A1* | 6/2014 | Rooks | ............... | G06F 17/30569 |
| | | | | 707/803 |
| 2014/0169554 A1* | 6/2014 | Scarisbrick | ............... | H04L 9/0863 |
| | | | | 380/28 |

* cited by examiner

Policy Rules

Rule #1

Secured by — Equals — Ajay@veradocs.com, Prakash@v ✕

Recipient — Ends with — veradocs.com ✕

+

If a condition is met, apply the following policy: View Only

☑ Give access (optional)  ☐ Allow User Override

*Please enter one item per line.

| Users | Groups | Domains |
|---|---|---|
| Joe@companyA.com | Group names | @company.com |

812 — Users
814 — Group names

FIG. 8

ACCESS FILES

CROSS-REFERENCE TO RELATED APPLICATIONS

This application is a continuation of patent application Ser. No. 14/939,226 entitled "ACCESS FILES," now issued U.S. Pat. No. 9,921,976, issued Mar. 20, 2018, which claims priority to earlier filed provisional application No. 62/137,920 entitled "DATA SECURITY MANAGEMENT", filed on Mar. 25, 2015, the entire contents of which are hereby incorporated by reference.

TECHNICAL FIELD OF THE APPLICATION

This application relates to data security management and more particularly to applying security to data and managing the data remotely to enforce policies associated with the data.

BACKGROUND OF THE APPLICATION

Conventionally, data being created, accessed and utilized in an enterprise type of environment have little to no security on a data-by-data basis. Current efforts to secure data fall short by requiring users to install or use proprietary software on a computer and/or a mobile device. Also, such software applications require users to move data to a particular service. However, most people use a variety of applications and services to perform their daily tasks, including email, cloud based storage, data creation tools, and the like. However, ensuring security when utilizing data across these applications and services is very difficult and inefficient.

SUMMARY OF THE APPLICATION

One example embodiment of the present application may provide a method that includes at least one of selecting data to be protected via a user device, applying at least one policy to the data, storing the at least one policy in a data record identifying the data, modifying a data format of the data to create a modified data and storing the modified data in memory.

Another example embodiment may include an apparatus that includes a processor configured to perform at least one of select data to be protected via a user device, apply at least one policy to the data, and a memory configured to store the at least one policy in a data record identifying the data, and also where the processor is further configured to modify a data format of the data to create a modified data, and the memory is configured to store the modified data in memory.

Another example embodiment may include a non-transitory computer readable storage medium configured to store instructions that when executed causes a processor to perform at least one of selecting data to be protected via a user device, applying at least one policy to the data, storing the at least one policy in a data record identifying the data, modifying a data format of the data to create a modified data, and storing the modified data in memory.

Yet another example embodiment provides a method that includes at least one of selecting data to access via a user device, identifying a user profile associated with the user device, retrieving at least one user policy associated with the user profile, determining whether the at least one user policy permits the user device to access the data, matching the at least one user policy to a data policy associated with the data, and receiving the data at the user device.

Still another example embodiment provides an apparatus that includes a processor configured to perform at least one of select data to access via a user device, identify a user profile associated with the user device, retrieve at least one user policy associated with the user profile, determine whether the at least one user policy permits the user device to access the data, and match the at least one user policy to a data policy associated with the data, and a receiver configured to receive the data at the user device.

Still yet another example embodiment provides a non-transitory computer readable storage medium configured to store instructions that when executed causes a processor to perform at least one of selecting data to access via a user device, identifying a user profile associated with the user device, retrieving at least one user policy associated with the user profile, determining whether the at least one user policy permits the user device to access the data, matching the at least one user policy to a data policy associated with the data, and receiving the data at the user device.

Yet another example embodiment provides a method that includes at least one of selecting data to access via a user device, applying at least one policy to the data that limits access to the data to user profiles assigned privileges to the at least one policy, encrypting the data, generating metadata indicating the at least one policy and pairing the metadata with the data, and storing the data and the metadata in a policy server.

And still yet another example embodiment provides an apparatus that includes a processor configured to perform at least one of select data to access via a user device, apply at least one policy to the data that limits access to the data to user profiles assigned privileges to the at least one policy, encrypt the data, generate metadata indicating the at least one policy and pairing the metadata with the data, and a memory configured to store the data and the metadata in a policy server.

Yet a further example embodiment provides a non-transitory computer readable storage medium configured to store instructions that when executed causes a processor to perform at least one of selecting data to access via a user device, applying at least one policy to the data that limits access to the data to user profiles assigned privileges to the at least one policy, encrypting the data, generating metadata indicating the at least one policy and pairing the metadata with the data; and storing the data and the metadata in a policy server.

Yet a further example embodiment provides a method that includes at least one of identifying a modification to a set of data performed by a user device, determining at least one policy to apply to the modified portion of the set of data based on a type of modification and a user profile associated with the user device, and applying the at least one policy to the modified portion of the set of data that limits access to the modified portion of the set of data to user profiles assigned privileges to the at least one policy.

Yet another example includes an apparatus having a processor configured to perform at least one of identify a modification to a set of data performed by a user device, determine at least one policy to apply to the modified portion of the set of data based on a type of modification and a user profile associated with the user device, and apply the at least one policy to the modified portion of the set of data that limits access to the modified portion of the set of data to user profiles assigned privileges to the at least one policy.

Still another example embodiment includes a non-transitory computer readable storage medium configured to store instructions that when executed causes a processor to perform identifying a modification to a set of data performed by a user device, determining at least one policy to apply to the modified portion of the set of data based on a type of modification and a user profile associated with the user device, and applying the at least one policy to the modified portion of the set of data that limits access to the modified portion of the set of data to user profiles assigned privileges to the at least one policy.

BRIEF DESCRIPTION OF THE DRAWINGS

FIG. 8 illustrates an example interface for the policy creator to use for applying policies according to example embodiments.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide data or more specifically data "document" security for various data services for various documents and access portals including uniform resource locators (URLs), videos, photos, emails, software code, etc. A security application layer can be attached to an application programming interface (API) and the resultant data is automatically encrypted. Any example included in this disclosure related to data may be data in a particular organized file format, message format, etc. The data may be a document or any organized/unorganized form of data. Any references to "data" or a "document" may be used interchangeably.

Figure 1A:
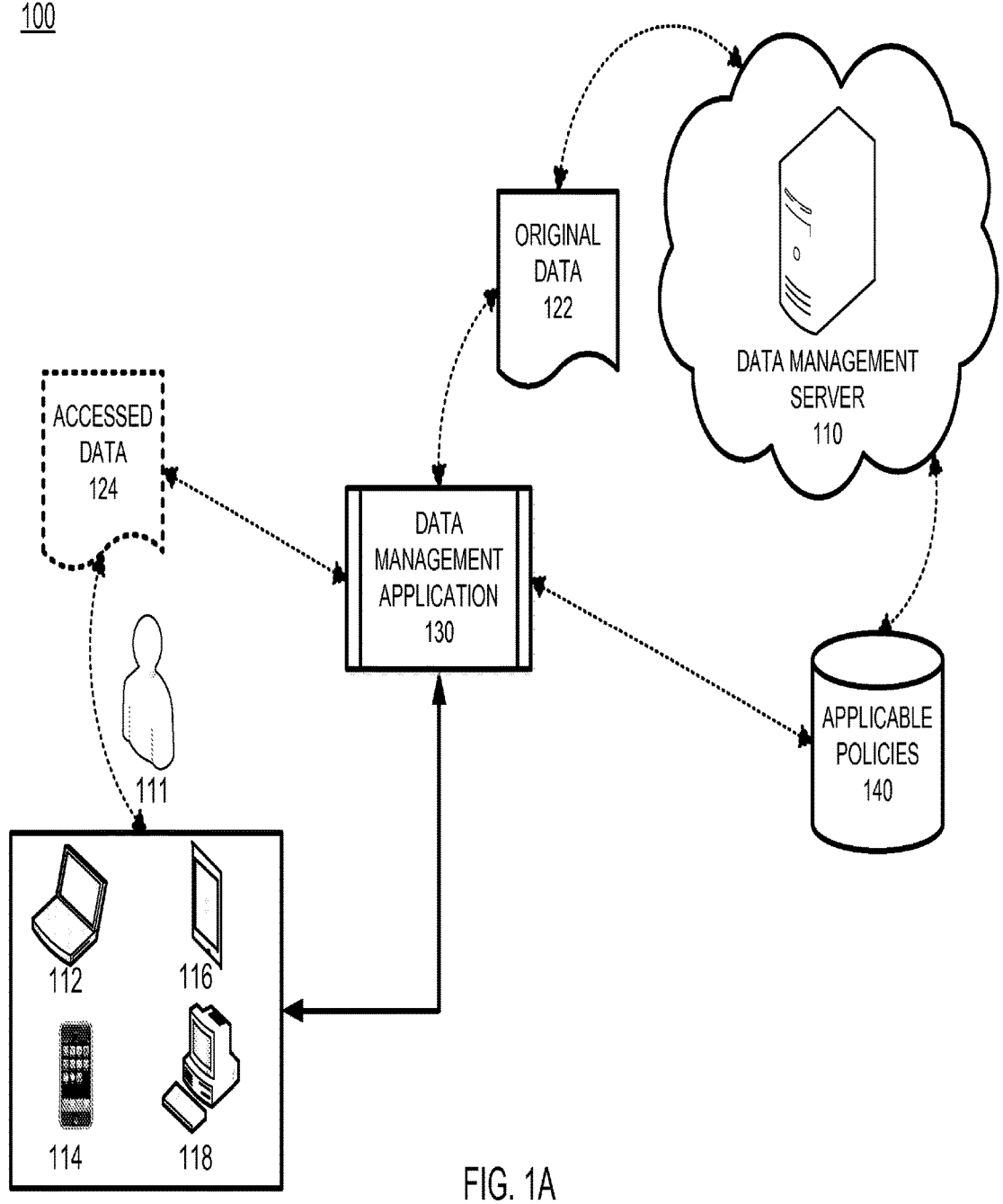
FIG. 1A illustrates an example network configuration of a back end server applying data security access policies according to example embodiments.

FIG. 1A illustrates an example network configuration 100 of a back end server applying data security access policies according to example embodiments. Referring to FIG. 1A, user 111 may be operating any of the various types of user devices including but not limited to a smartphone 114, a personal computer or laptop 112, a tablet computer 116 or a desktop computer 118, and/or any device that includes a processor and/or memory and is communicably coupled to a network and/or another device. Such a device may be an appliance (such as a refrigerator or washing machine), a transport (such as a vehicle or train), and/or any device associated with the "Internet of Things" (IoT). In operation, the user device may have a client application installed, such as data or data management application 130. In operation, the user creates or receives data such as data, an email, a photo, a video, a voice or sound file, a multimedia file, and the like. The data may be specified by name, content, author and/or location. For simplicity, the data will may be referred to as a document herein but can include any of the types of data described above. The user may receive data via a number of mediums such as email or may access the data in a particular file storage location that is either on the user's machine or at a remote site, such as the data management server 110, a database (not shown) or another device (not shown). The data being accessed may have been processed by the management server 110 and may not be the same as an original data 122. For instance, the version of the data may have changed to a secure version 124 that is accessible via the data management application 130.

Figure 1B:
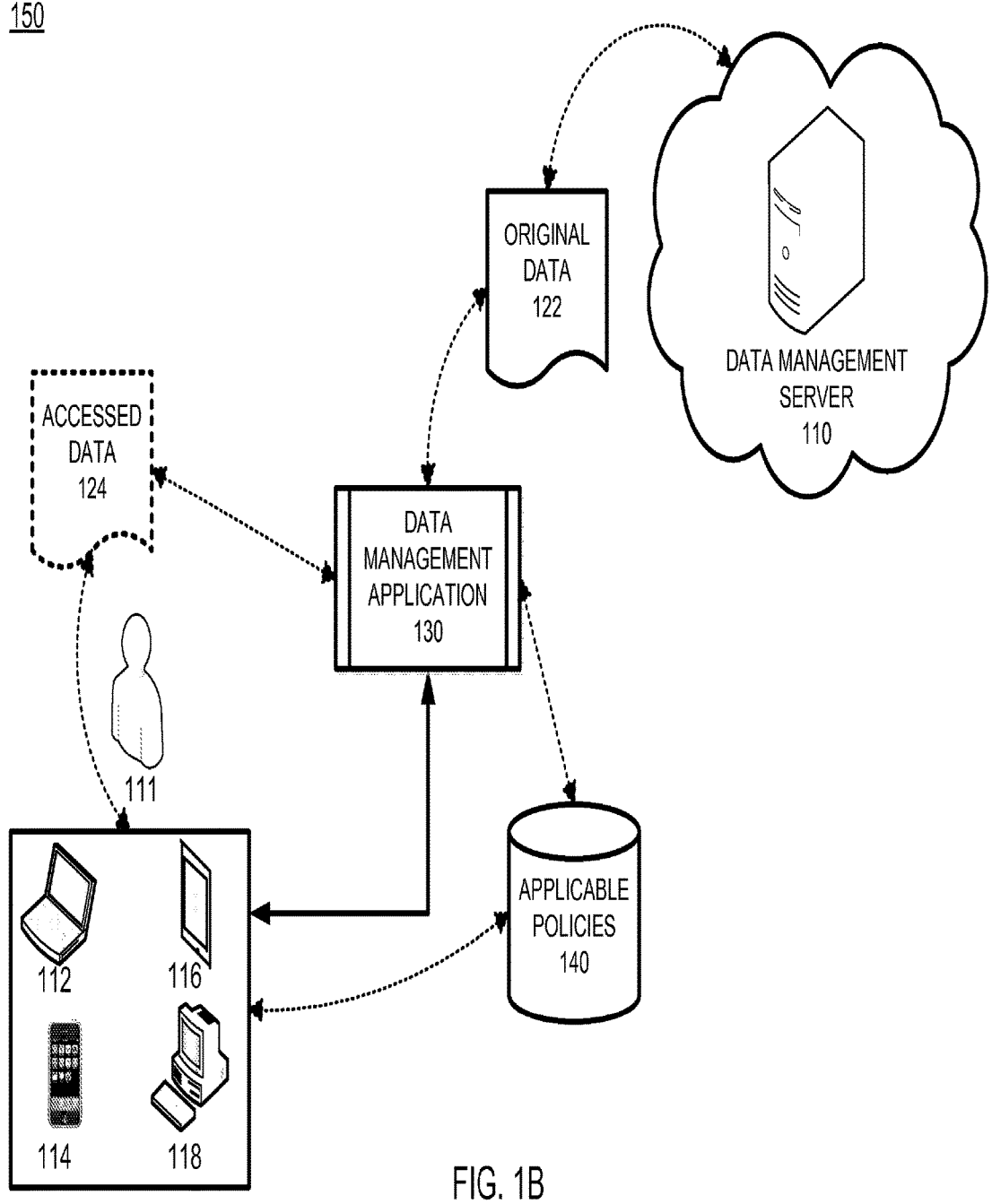
FIG. 1B illustrates an example network configuration of a user device applying data security access policies according to example embodiments.

FIG. 1B illustrates an example network configuration 150 of a user device applying data security access policies according to example embodiments. In operation, the user device may have a client application installed, such as data or data management application 130. The user creates or receives data such as data, an email, a photo, a video, a voice or sound file, a multimedia file, and the like. The data may be specified by name, content, author and/or location. For simplicity, the data will may be referred to as a document herein but can include any of the types of data described above. The user may receive data via a number of mediums such as email or may access the data in a particular file storage location that is either on the user's machine or at a remote site, such as the data management server 110, a database (not shown) or another device (not shown). The data being accessed may have been processed by the management server 110 and may not be the same as an original data 122. For instance, the version of the data may have changed to a secure version 124 that is accessible via the data management application 130.

When modifying original data 122, the client device 112 may first identify the data 122 and perform one or more actions such as process the data to encrypt the data, add metadata and store the data in a particular location. The data may also have certain policies enacted and stored in a policy databank 140. The policies may be retrieved and applied to the data prior to and/or when a user attempts to access the data. The user may also have a profile that is identified and used to determine whether that user has any rights with respect to the data that is secured via the application. The accessed data 124 may be an encrypted and modified version of the original data 122.

Policies may be invoked responsive to various actions taken by a user. For instance, a print command is sent from a user device interface to the operating system as it normally is, however, an audit agent maintained by the application identifies the print command as being associated with a protected file, the command is intercepted, and the policy is checked which results in a rejection based on a preliminary comparison of the user permissions stored on the server as part of the user profile. For that particular user profile and policies and that particular data segment or data file, the user does not have permission to print the data and thus the policy is invoked during the audit of a user initiated command, such as print. Other examples of user initiated commands may be copy, delete, adding text, etc. All of those user input commands may be captured by an audit agent that begins operation once the policy has been enacted. The policy enactment may begin whenever a policy is discovered and linked to a particular user and/or the particular data being accessed.

The original data may be encrypted and wrapped via a file modification function. For example, a .pdf document type may be secured and wrapped to appear like a .pdf document, however, it may be converted to HTML so it is accessible via a browser. When the data security application is operating, an option, such as "secure data with security application" may appear in a user interface. Once selected, the application may then encrypt the file via AES encryption or via other encryption operations, such as zero knowledge encryption where encryption keys are not fully known or held by one entity or node. A wrapper is placed on the file which includes metadata describing how any applied policies are to be handled, how the data should be accessed via the security application server, etc.

The document wrapper may be HTML however, the wrapper may appear as a .pdf or WORD document. The wrapper is placed on or around the encrypted data. A policy is used to specify what user(s) has access to the data, who can print, modify, delete, forward the data, etc. Information on the server, such as a user contact name/email address, etc., may be used as a unique identifier to identify the user device and/or user. All of the parameters can be pre-set or set by selecting one or more boxes, via a drop-down menu, etc. in a user interface. Also, data can inherit privileges based on where they were stored. For example, an executive user of an enterprise network may select and place a file in a folder setup only for executives with certain privileges and as a result, the data may inherit those privileges.

Figure 2A:
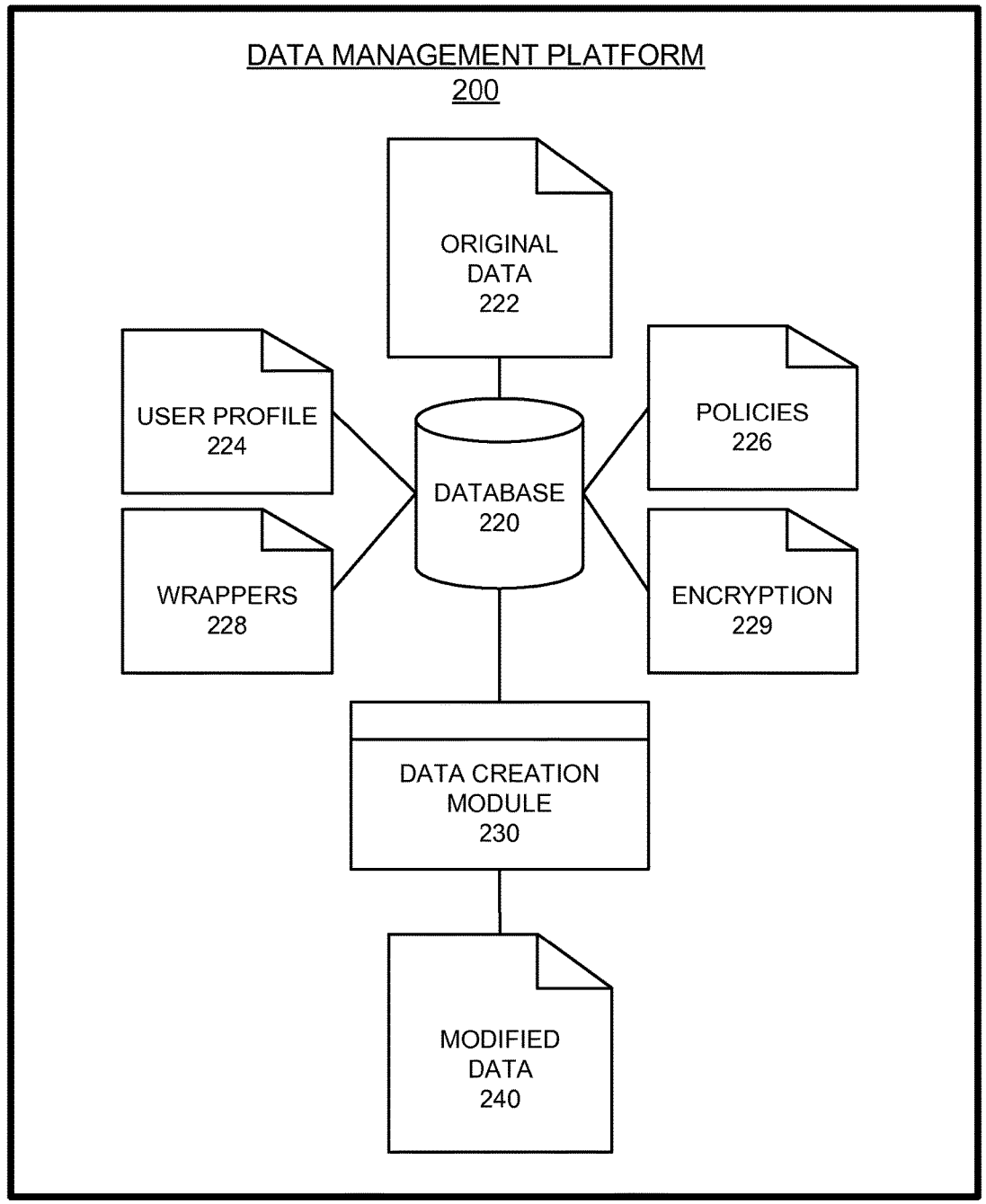
FIG. 2A illustrates a logic diagram of the data securing procedure according to example embodiments.

FIG. 2A illustrates a logic diagram of the data securing procedure according to example embodiments. Referring to FIG. 2, the data management platform 200 includes original data 222 that is stored in a database 220. The data 222 will be processed to identify a user associated with the data security enablement via a user profile 224 and policies 226 that are applied to the data 222 for security measures. The data is then encrypted via a particular type of encryption 229 and a wrapper 228 is applied to the data so the user interface may present the data as a particular format regardless of the data contents. The data creation module 230 performs the data securing functions and creates the modified data 240. The result is a data that is provided to the user and which is remotely managed by a data management server 110.

When the security application agent, which may be operating on the user's device, begins to process an unsecured data, the procedure may initiate by encrypting the original data and placing the encrypted data into a HTML data format. The server 110 is notified of the newly secure data and information about that data is placed in the database 220. It is important to note that the server 110 and the database 220 may be self-contained, co-located or separate devices and more than one server (not shown) or database (not shown) may be included in the platform 200 and operate in a similar manner as described herein. The data name, type, size, owner (i.e., creator/securer), users with access, policies associated with users, tenant information, data identifier, etc., may all be placed in a data profile file or other information storage location.

During the data securing procedure, the data is encrypted and placed in an HTML shell so the contents can be accessed and re-created/decoded (i.e., decrypted) in a web browser, for example. In an encryption procedure, the server 110 generates a key and the security application operating on the user device retrieves the key prior to encrypting the data. Once the verification is completed, a fetch key operation may be performed for the specific data from the server over an encrypted channel, then the security application can decrypt the data and the user can view the data contents.

Figure 2B:
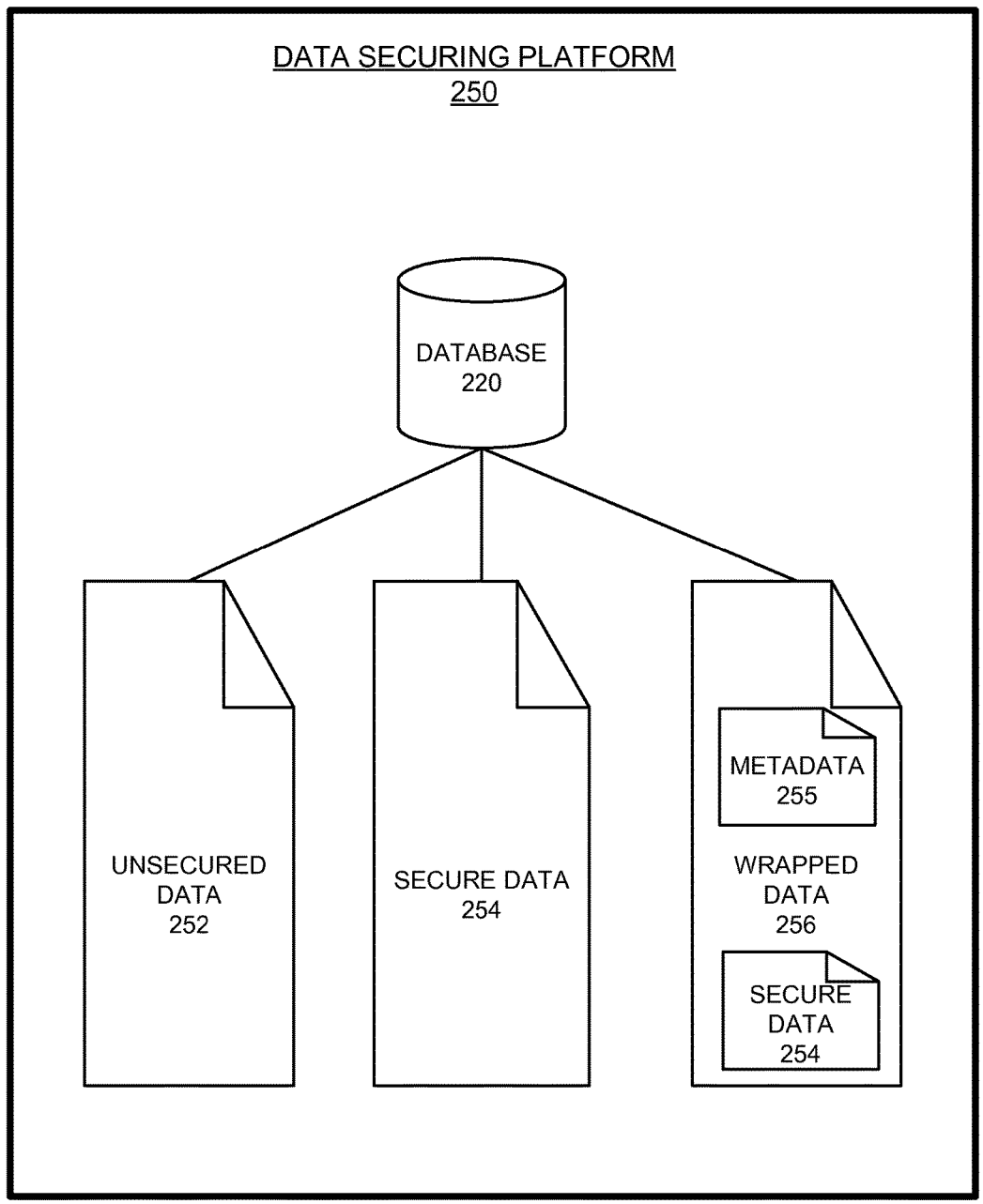
FIG. 2B illustrates a logic diagram of the data wrapping and securing procedure according to example embodiments.

FIG. 2B illustrates a logic diagram of the data wrapping and securing procedure according to example embodiments. Referring to FIG. 2B, the data securing platform 250 includes a series of data formats utilized during the data securing operations. For instance, the unsecured data 252 may be any type or format of data that is realized and stored in memory on the user's device or the server/database 220. During a file securing operation, the unsecured data 252 is identified and selected. The data can then be encrypted via an encryption format, such as AES256 encryption. The data is then considered secure data 254. The metadata may also be extracted along with a server request where the encryption key is sent to the server along with key metadata which may include user device information, user profile information, policy information of the user profile, policy information of the data, user access information (i.e., permissions). The data may then be stored in HTML format and corresponding metadata 255 is placed in the header of the HTML file to identify the tenant server via a URL, a secure file name, etc. Any attempt to access the HTML file with launch the user's default browser if the corresponding application is installed on the user device. The wrapped data may 256 be an icon or logo of the original unsecured data format (e.g., pdf, WORD, etc.) that includes the HTML data secured 254 and the metadata 255.

During a file or data securing operation, the data remains on the user's device and the key is sent to a remote database or policy server in the cloud. The key can be sent during a unique key transmission via a secure socket layer (SSL). When another user attempts to view the data via another user device the document may be transmitted to the user as it normally would be via any type of access attempt, however, the key must be sent from the policy server to the device performing the attempted access operation. The files are generally not stored on the remote server, instead, only the encryption keys are stored and the user profiles and the policies for both documents and user profiles.

When a request is transmitted to the policy server, the transmission may be a SSL type transmission that includes exchanging of user information, file/data information (i.e., name, path, location), device information and access and policy information. Once a positive match can be made to that particular user device, the key used to decrypt the data is transmitted to the user device. The file will be encrypted/decrypted on the user devices. The access, encryption, decryption, etc., will all be time-stamped. Example policies may include editing, saving, printing, copying, pasting, offline access, watermark access (obstructed view), x-ray access (limited view), one-time view, time bomb duration (limited access window with self-destruct). Data segments or portions of a larger data set may require similar policies in order to share and transfer data. For example, cutting and pasting data from one data segment to another may require a policy match prior to permitting such an exchange data action to occur. The x-ray could be applied dynamically as needed by the dimensions of the platform/application being used during an x-ray invocation or recalling operation.

Other limiting security features may include a watermark layer that is overlaid on the data or the data file. For example, various pixels and colors can be set over the data so only a secure user profile can receive the specific watermark policy to view the data and have the colors lifted and the intelligible data can then be realized. Also, the X-ray feature may permit small portions of the document to be viewable at a time (i.e. a portion of a page of data). The remainder of the data may be darkened and/or blurred. The user may scroll the viewable and limited window to realize more information, however, full access may remain available only to those user profiles with the correct credentials. The watermark may be applied based on who is accessing the secure file in which case a unique watermark can be set to identify that individual. This not only applies to viewing but also printing of the watermark invoked data. Alternatively, a large number of colors can be applied to the data thus making it difficult to remove the watermark.

Once the data is secured, the data may be stored on a same device that it was secured and may be stored anywhere. The data is stored in an encrypted state within the "shell doc", which may be an HTML document. During the process of the unsecured data becoming secured, the encryption command may be received from either a manual queue by the user device where the data resides and/or by an automatic queue which would also be on the device that the data resides. For example, if the user right clicks on a file, selects the secure option, the application transmits a request to the server for the encryption keys and secures the data while maintaining the data on the user device.

Figure 3:
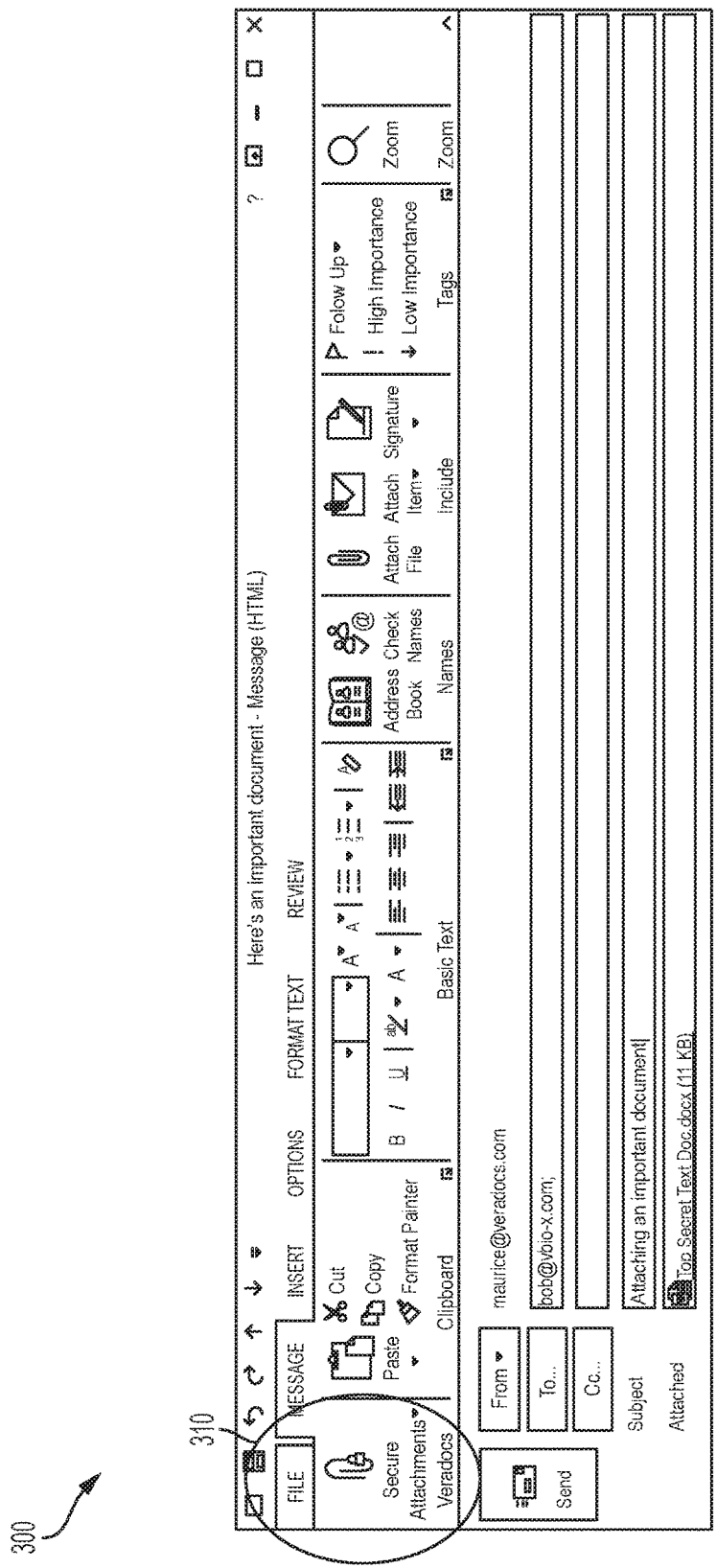
FIG. 3 illustrates a user interface of data securing application integrated with a user email application according to example embodiments.

FIG. 3 illustrates a user interface 300 of a data securing application integrated with a user email application according to example embodiments. Referring to FIG. 3, the securing option button 310 at the top left of the screen provides the sender or data creator with an option to select the policy associated with the attached data. All users in the "To:" line of the email interface will be provided with access to the data and will receive the policy selected by the sender. The data is secured upon hitting the "Send" button.

When a policy is identified from the server and is applied to data the policy can be applied to the actions taken or attempted by the user device. The application process operates between an application level and a system level. For instance, when a user attempts to print, the application attempts to send the command to the operating system, but the application intercepts that command, recognizes that it is not allowed by a policy and blocks the command from being acted upon since the policy did not authorize such an action.

Data stored on one user device and then accessed by another user device requires a key to be accessed and applied from that policy server. The data does not need to be stored on the server but instead the data can move directly from one user device to another user device by any form of communication including email, cloud sharing, local sharing, thumb drive, etc. The data itself is within the shell document, which is a file that can be shared by any method that users share data. When a user is provided with access to a secure file, a policy is assigned to that user for that file and may be stored in the user's profile. Within that policy is a number of permissions unique to that policy. Once the user has access to any file for any degree of access, the user's actions are compared to the given policy and enforced accordingly to allow or deny the user rights.

Figure 4:
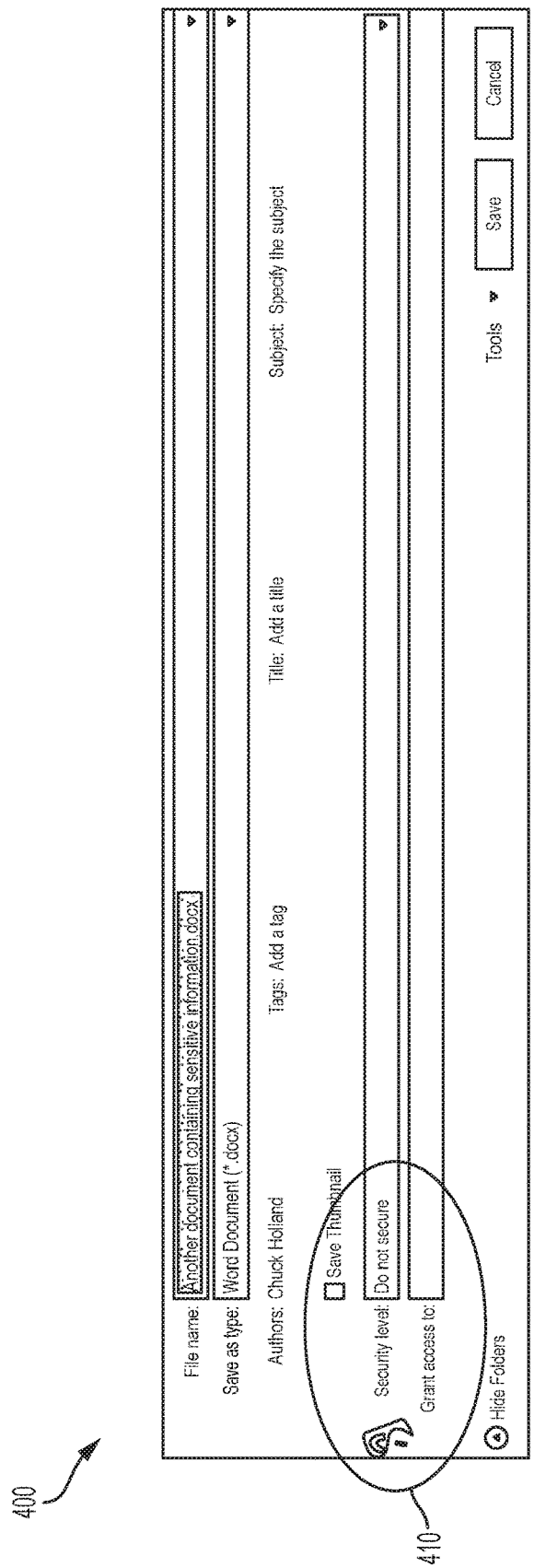
FIG. 4 illustrates a user interface of a securing option associated with the secure application according to example embodiments.

FIG. 4 illustrates a user interface 400 of a securing option associated with the secure application according to example embodiments. Referring to FIG. 4, when securing a file via a MICROSOFT OFFICE application, the additional options "security level" 410 under the 'Save As' dialog box permits the user to select the policy to be associated with the data. The users entered in the "Grant access to" input field may receive those options. The data is secured upon transmission.

Figure 5:
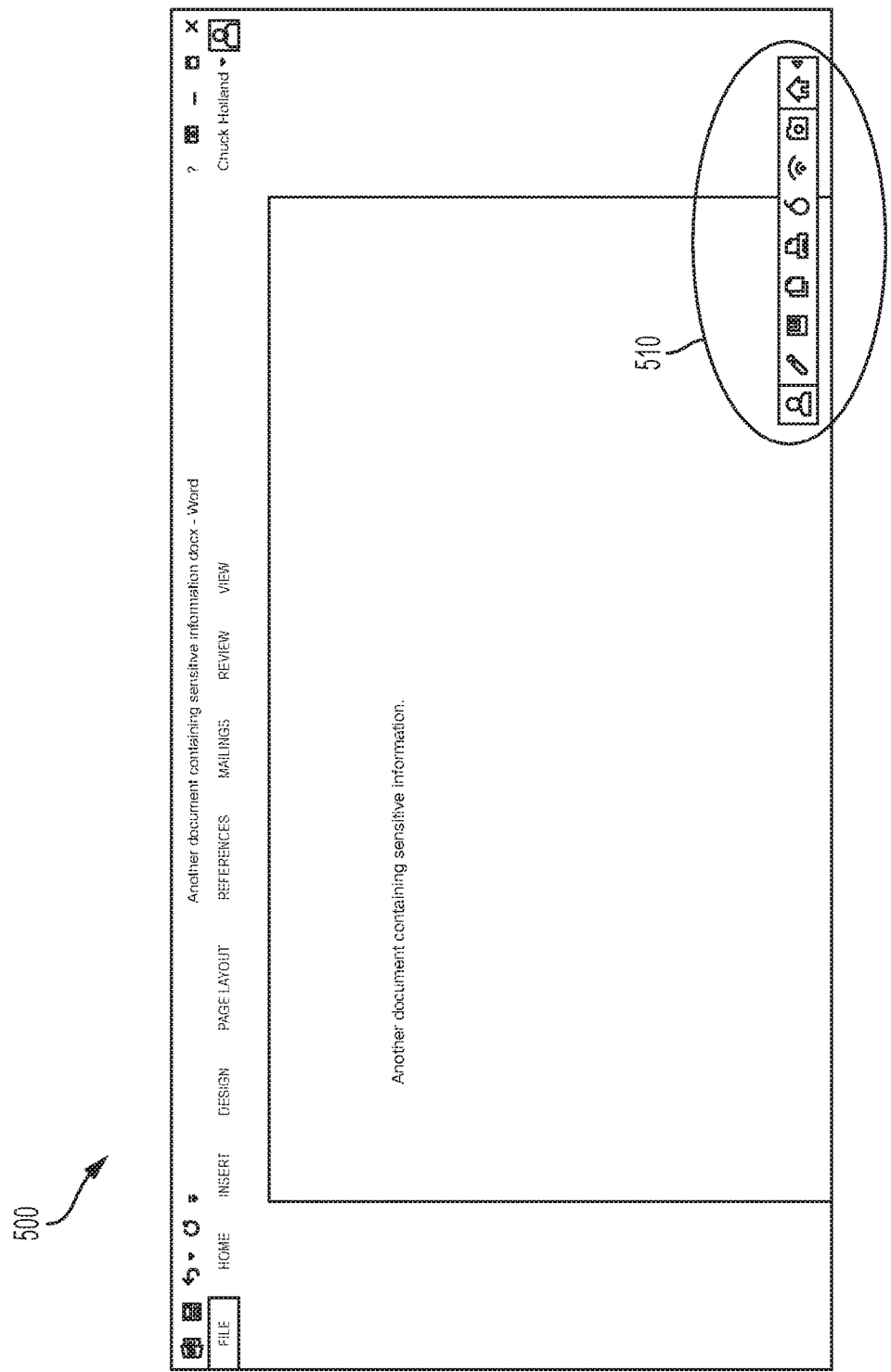
FIG. 5 illustrates a user interface of an access option provided by the application according to example embodiments.

FIG. 5 illustrates a user interface 500 of an access option provided by the application according to example embodiments. Referring to FIG. 5, the policy bar at the bottom right 510 indicates that the data being viewed is secure data. The icons in the policy bar indicate to the user which policies are in effect and a tool-tip is displayed when the user hovers over the icons. This interface will be used when the data is accessed and opened for viewing privileges or a lack thereof.

Figure 6:
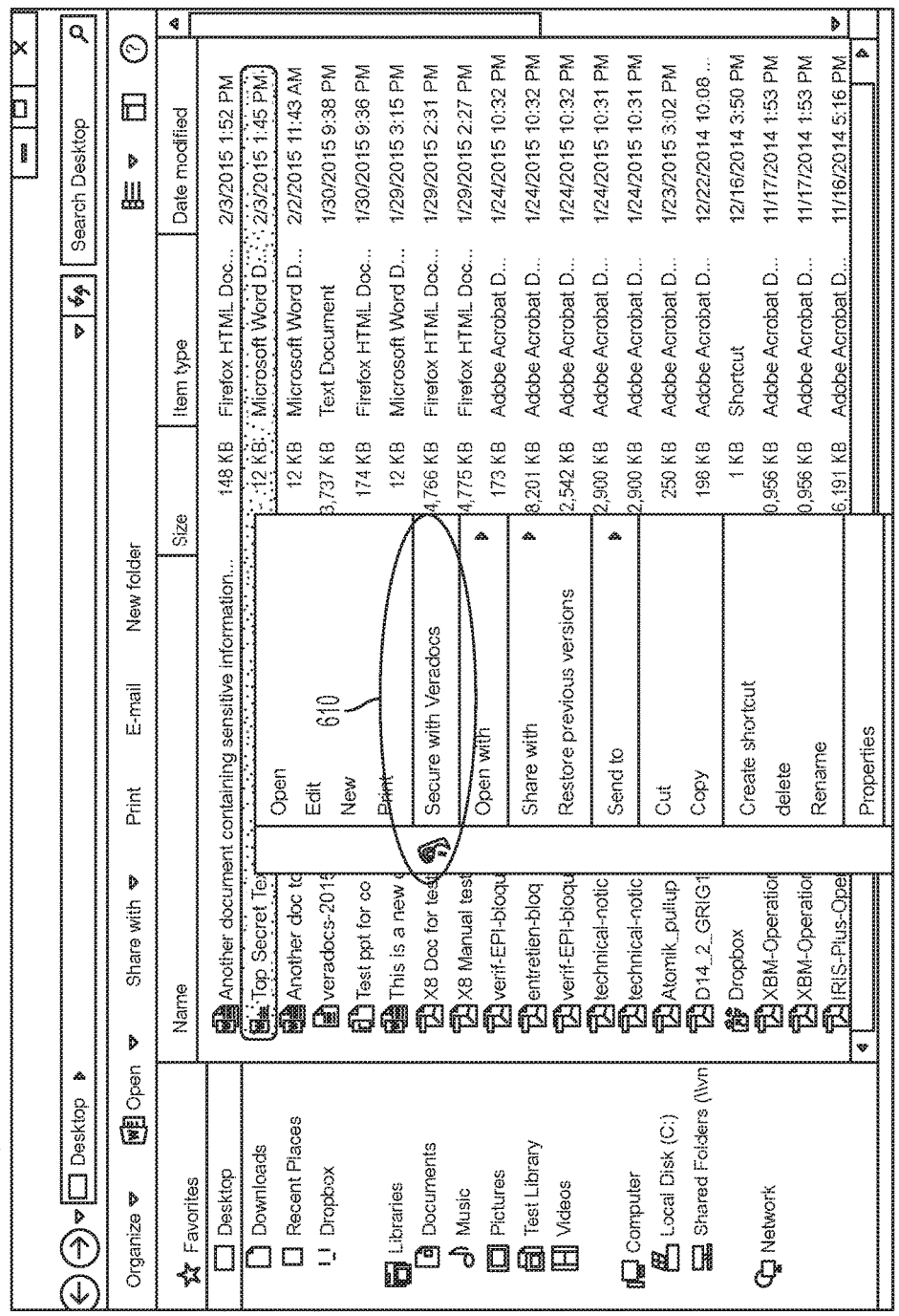
FIG. 6 illustrates a user interface of selecting data and the secure function of the application according to example embodiments.

FIG. 6 illustrates a user interface 600 of selecting data and the secure function of the application according to example embodiments. Referring to FIG. 6, the user may be accessing MICROSOFT EXPLORER or FINDER on an APPLE interface by right clicking on a file, which the user then exposes the context menu. The "Secure with Security application" line item 610 may be selected to permit the user to apply the policy and users to share the data with in a secure manner.

Once the data has been secured, encrypted and converted it becomes an HTML file type that contains the encrypted file contents. The data may appear to have a particular logo file type but the data may have an actual HTML extension and HTML data. For purposes of this example, the data being converted to HTML and having a different appearance may be referred to as wrapping the data. The data itself has changed to a HTML format but it may appear like a .pdf document by icon.

The wrapping procedure may include the original data being encrypted and wrapped with the HTML shell. The encrypted bits are a part of the HTML data. Those skilled in the art would readily recognize that the wrapping procedure could utilize various different file types that are desirable for applying security options. The identifier ID of the shell is used to communicate with the backend of the server 110. The server may catalogue various data identifiers that represent secure data. Such data information in the data file or folder for each secure data may include a file name, file size, file encryption/decryption key, users/groups with access to the data, data metadata, policies applied to the data, records of user access, user modifications, etc. However, the server 110 generally does not store a copy of the file itself. The server 110 is used to provide access to data not store the data. The metadata may include the shell document with a version, DocID, Doc name, Mime type, server URL and a tenant identifier. The application securing the data provides this information, in most cases from the server to the shell document. The metadata resides in the wrapper along with the encrypted data all of which can be used to identify the secure file.

The original data contents are encrypted and stored as an HTML file format that requires the server for access to such data. The metadata that describes the policy handling resides within the HTML shell as well along with the data contents and may appear as text in the HTML file. The metadata may be at the top of the data and the actual secure data content is all of the letters and numbers (HTML) throughout the HTML file. The metadata is used to identify the data to the server and/or the security application.

The user's policy is stored and logged just before the file is sent to the user responsive to access being granted. For example, user A secures a file and provides user B with access (i.e., email). User B may not yet have the actual file, however, the server already is aware that user B has access to the file. When a user of the application accesses data, the user must have already installed and logged into the security application on their device or identified herself in a browser before they receive access to the data. The security application client operating on the user device knows the user and what tenant they are associated with. The server also has records of whether or not a user has access to a secure file.

Figure 7:
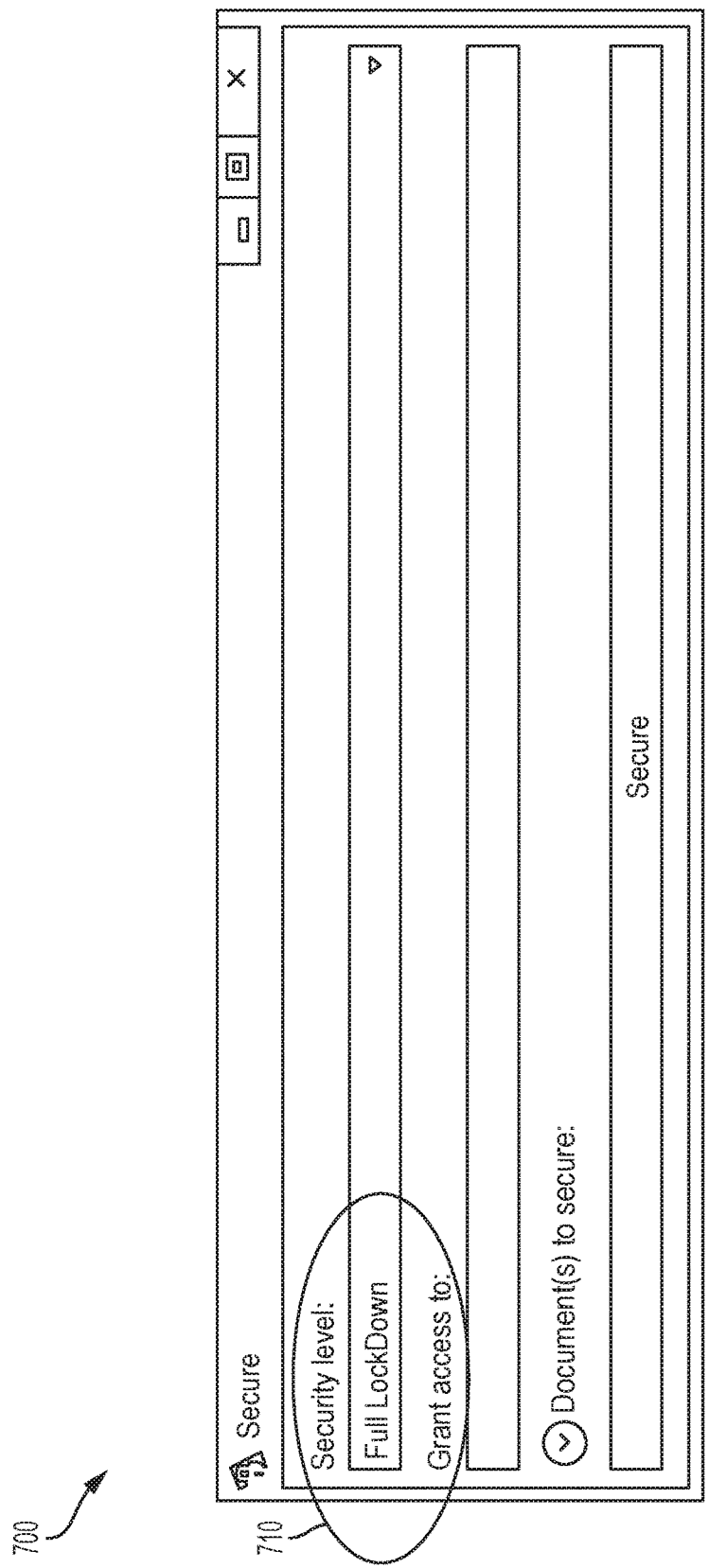
FIG. 7 illustrates a user interface of a policy selection menu according to example embodiments.

In one specific example, a user 'Admin' creates a rule called Rule #1. In the rule, the requirements are as follows: SECURED BY EQUALS Ajay@veradoc.com or Prakash@security application.com AND RECIPIENT ENDS WITH security application.com. In this case, the 'View Only' policy is assigned to the file and access is grated to joe@companyA.com and everyone with the company-.com domain and everyone in the sales group within the tenant. In the above example, whenever Ajay or Prakash secure a file and the recipients are in the security application domain, the data is secured using the 'View Only' policy. In addition, the list of people entered in the user interface will also receive access and the same 'View Only' policy. FIG. 7 illustrates a user interface 700 of a policy selection menu according to example embodiments. Referring to FIG. 7, the security level drop down menu 710 may provide various options for the user to select.

FIG. 8 illustrates an example interface for the policy creator to use for applying policies according to example embodiments. Referring to FIG. 8, the Admin portal 800 permits the Admin to create an automated procedure of securing of files under specific conditions. The rules can be selected 810 and applied to specific users, domain or tenant groups, etc. This provides a fast and easy way to begin enforcing enterprise-wide security policies to data and users. A redact flow process would permit users to tag portions of data and then display those portions to different user depending on their access rights. Everyone could be sent the same data, but depending on who you are you would only be able to see specific portions of the data. For example, if the data is opened by one user with more rights the user could view more of the data than another user with fewer assigned rights who opened the same data. Additionally, a certain user could modify data and the modifications would automatically not be viewable by all users since that user has an elevated level of security. A single document or data entity may have various levels of security associated with certain portions of the data. The users may be identified based on names 812 and/or groups 814 or even domains.

A user could belong to a certain group or domain, which would determine what policies would be applied to that user. The user could also be restricted by their location at any given time. For instance, user A is in the office so they receive 'Edit' rights to the data, but when user A is in China they receive 'View Only' rights. The server can identify the user's location based on IP address or other location identifiers and then apply the policies accordingly. The user could also be restricted by the type of device they are using to access the file. For example, a user could attempt to open important data on a smartphone in which case the data may be at a higher risk of being viewed by the public, so the access may be prevented.

Referring again to the redact feature, the user would be able to highlight certain portions of data text within a document or other data entity and assign certain users access via tagging of those sections. For example, the owner of the data would highlight certain sections that discussed the financials of the company. The owner would tag these as "financial". The owner would highlight some other parts of the data as being related to "project x" and tag those portions the same way but for a different purpose. Then the user would assign specific users access to text with "financial" tags and others access to text tagged with "project x" tags. By doing so the same data could be sent to many users but only specific users would be able to see specific sections of the data. Or, the users may be already organized into groups that match financials and project x, in this case the policies will be applied automatically upon receiving tags in the data for those groups.

When a user attempts to open the data, the security application app reaches out to the server and notifies the server that the user is attempting to open the data. The server returns information to the Security application app —user access rights, the policy associated with the user and the data and so forth. Assuming the user has access rights, once the data is open the user is restricted to the policies that have been set. When the user attempts to perform an action that is restricted, the user is denied that action and the server is sent a message of the event. If the owner of the data, or an admin user, decides to revoke access from the user, the updated status is pushed to the security application and the data is closed, if currently open, and the user is blocked from opening the data at the very next attempt for data access.

Figure 9A:
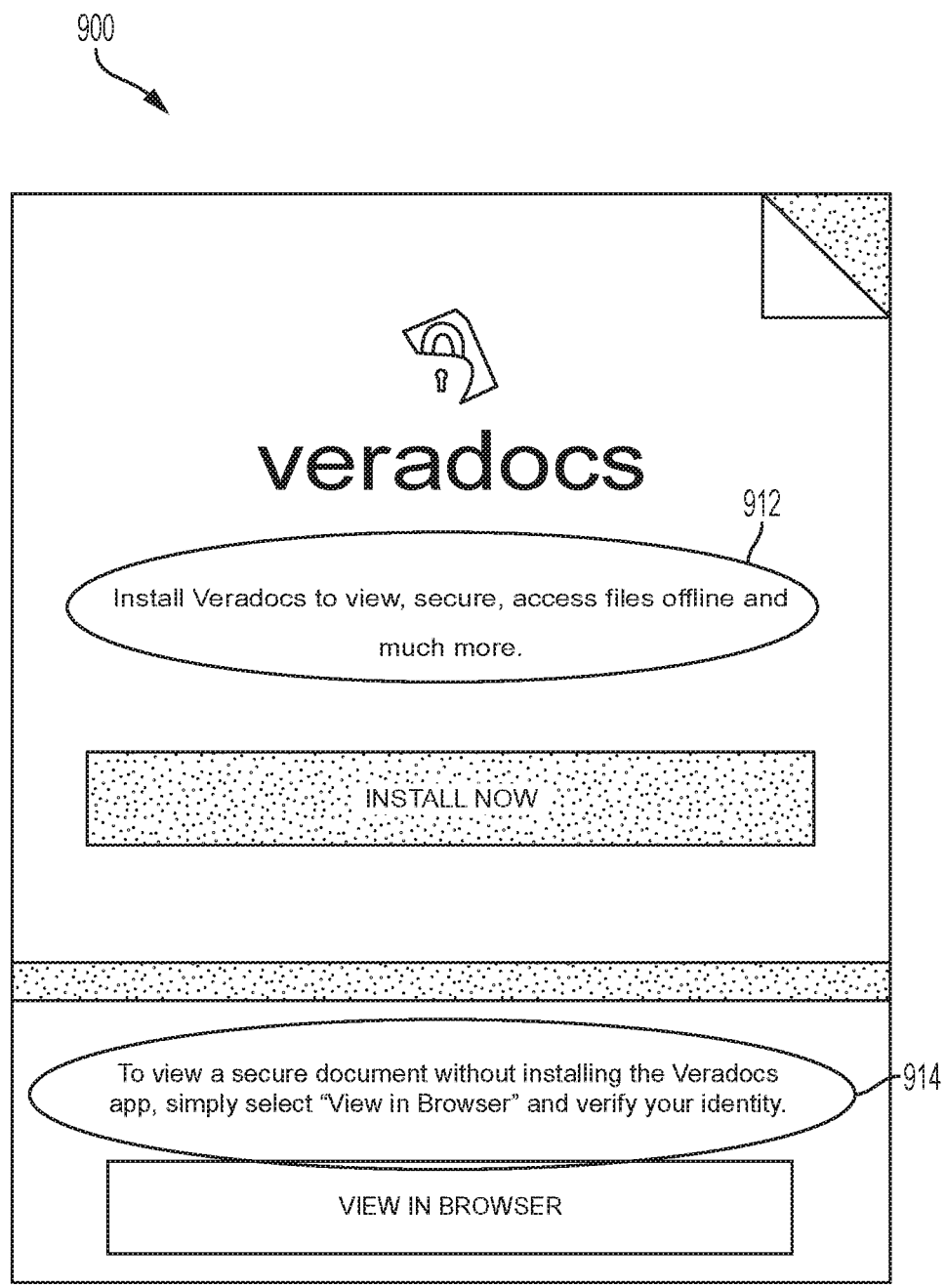
FIG. 9A illustrates a user interface of attempted data access to secured data according to example embodiments.

FIG. 9A illustrates a user interface of attempted data access to a secured data according to example embodiments. Referring to FIG. 9A, when the user attempts to open secure data, the interface screens 900 will appear assuming the user does not have the security application agent already installed on their computing device. The user is notified, within a browser 914 since it is recognized as an HTML file, what is needed to view the data or the application itself needs to be installed 912 to use that particular viewer. In either case, the user must verify their identity before they can access the data.

Figure 9B:
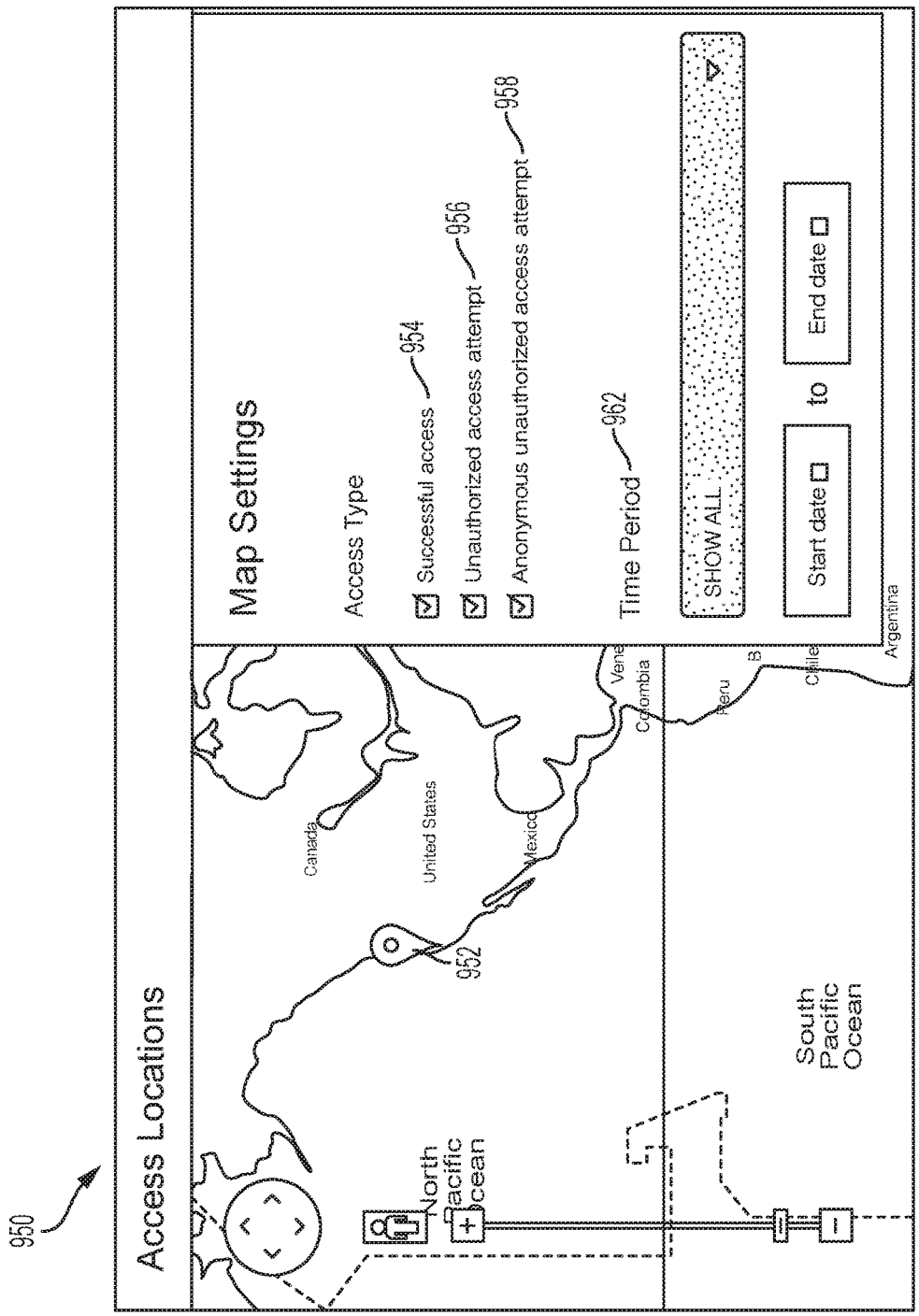
FIG. 9B illustrates a user interface map illustrating attempted data access to secured data based on geographical locations according to example embodiments.

FIG. 9B illustrates a user interface map illustrating attempted data access to secured data based on geographical locations according to example embodiments. Referring to FIG. 9B, the heat/location map illustrates areas in a geographical region (i.e., California, United States, Americas, World map, etc.) where a user has attempted to access a secured document secured via the security application of the present disclosure. In operation, an administrator with administrative or master privileges may access the heat map interface 950 and identify locations on the map where a particular document was accessed, attempted to be accessed, a user was denied access, modifications were made, copy/paste/modification, etc., or any other document related action was performed. Anytime a user accesses a document and can be identified or the document access operation is performed, a query, statement submission message or general access message is created to identify the action performed. The action may include a hardware profile, user profile, action type, etc., and the information may be transmitted to the application server to update the location of the user via IP address, GPS location information, and/or a last known access location of the document as a basis for the action location. All access operations whether deemed valid or not including 'open', 'copy', 'paste', 'forward', etc., will be logged and a map location may be performed. Referring to the map 950, the location pin 952 may be placed based on any of the audit criteria including successful attempts 954, unauthorized access attempts 956, anonymous attempt 958, etc. The colors of the pins may vary by the access type of operation performed. The time period 962 may be setup as well to identify a period of time during which an audit should be performed.

There are three states that can be enabled regarding copy/paste options, including protected docs, all docs and disabled. Protected docs restricts copy/paste options only between secure data. All docs permits copy/paste options between secure data and non-secure data as well as secure data and other secure data. Disabled restricts copy/paste options altogether. All restrictions are handled on the copy side. Disabled means that when the user attempts to copy data, no data is copied to the clipboard. Protected docs means that the when the user attempts to copy data, encrypted data is copied to the clipboard. If the user attempts to paste into a non-secure data space nothing is pasted. If the user attempts to paste into a secure data space, the data decrypted is successfully pasted. All docs means that when the user attempts to copy data, the data is copied to the clipboard as normal and can be pasted anywhere (secure or non-secure data).

Figure 10:
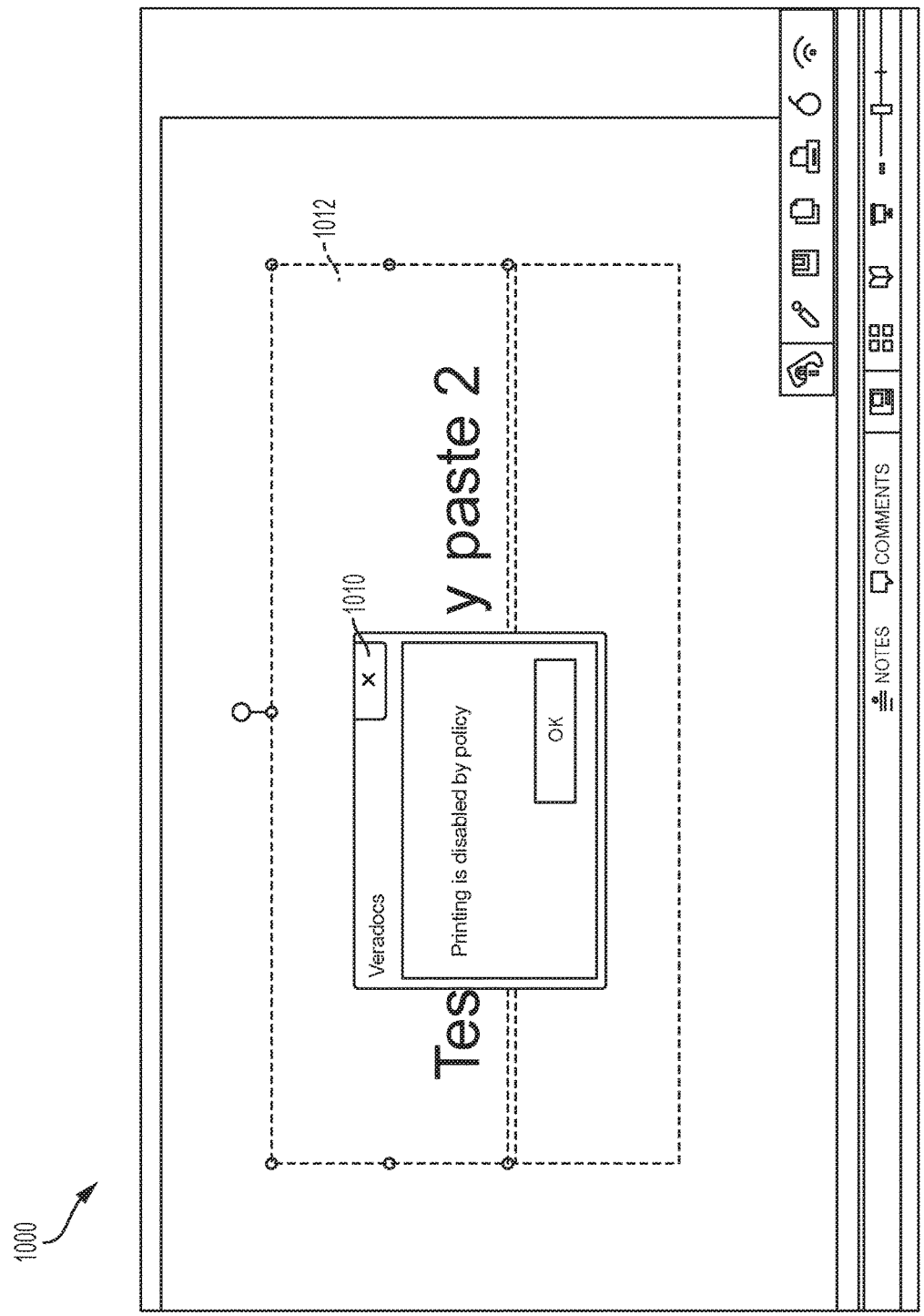
FIG. 10 illustrates an example of a restricted user interface that appears when the user attempt to copy and paste data without having the proper policies/rights.

FIG. 10 illustrates an example of a restricted user interface that appears when the user attempt to copy and paste data without having the proper policies/rights. Referring to FIG. 10, the interface 1000 includes a portion of the data that is highlighted for a copy operation 1012. The attempt to copy that data will invoke a popup window 1014 informing the user of the restriction.

Policy enforcement by the application/server is an ongoing procedure, the security application operates between the application interface and the system layer. When a user attempts an action within an application, such as WORD, the action passes through the security application which either permits or blocks the actions. All of these events are logged to the backend server 110. For example, a user may attempt to edit and then save a WORD document that they do not have "Edit" rights to access. When the user clicks "Save", the action is captured by the security application and denied. An error message is displayed and the event is logged to the backend server to reflect the attempted modification or successful modifications.

With the security application running on a computing device, the secure files can be restricted to being opened in only specific applications. For example, a secure PDF type of document could be forced to only be opened in ADOBE Reader XI. The file will not be decrypted and handed off to any other application. For example, a user attaches a file to an email with people in the "TO:", "CC:" and/or "BCC:" fields. A rule can be placed so that file has a certain level of security/policy. The email is sent to a user(s) and the security application can identify the user's credentials and the data and if acceptable the user can access the file. The application can also interject and ask for more verification from the user to determine if you are really the owner of the email using "SAML", ambient data and other authentication techniques.

Examples of whitelisted applications (allowed) vs non-whitelisted applications (forbidden) may include WORD, which could be a whitelisted application and CHATTER which is not since CHATTER has its own language it uses to communicate to its servers which cannot be deciphered by the present security application.

A web shell is created and information can be encrypted/decrypted. A browser extension may provide a way to track user activity which works with an application layer. Then, the application may decide if the tab or data is whitelisted and can be protected. If, for example, a user is in FACEBOOK, then the application is not whitelisted and all data is passed through the application layer and no changes are made.

Figure 11:
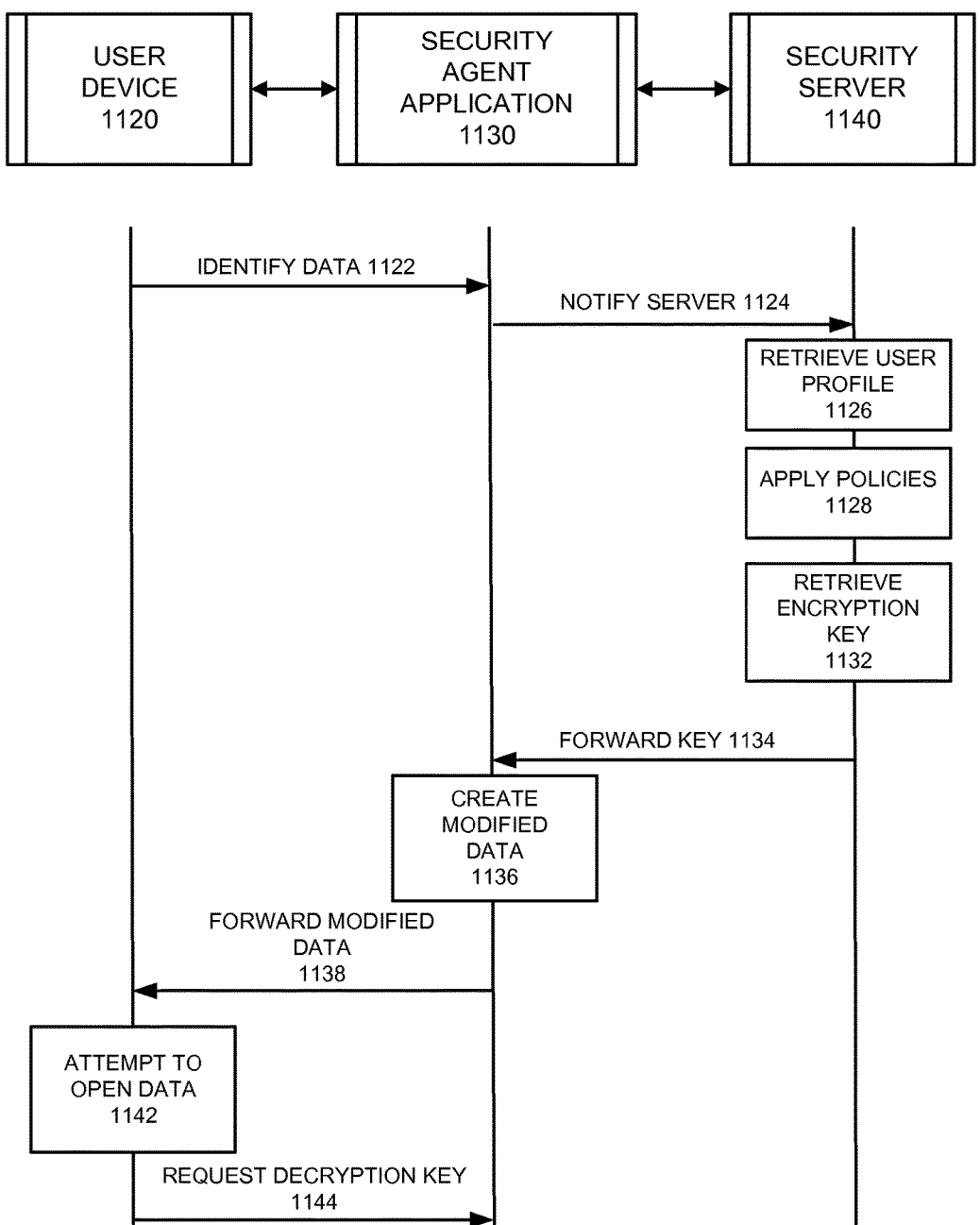
FIG. 11 illustrates an example system communication diagram of a procedure for creating secured data according to example embodiments.

FIG. 11 illustrates an example system communication diagram 1100 of a procedure for creating secured data according to example embodiments. Referring to FIG. 11, the user device 1120 may be operating a security management application agent 1130 that communicates with a remote server 1140. In operation, a user may identify particular data 1122 and the agent application may notify 1124 the server of the user device activity and desire to secure the data. The server may then retrieve a user profile 1126 associated with the user device and apply policies 1128 to the data based on the goals or interests of the user communicated through a user interface. The server may then assign and retrieve 1132 an encryption key that can be used to encrypt the data of interest. The key may then be forwarded 1134 to the user application which manages the data conversion process 1136 of encryption and file format changing. The modified data may then be forwarded 1138 to the user device for review or to another user device as a link, email or other accessible format. The user device may then attempt to open the data 1142 and the user credentials may be identified and transmitted to the application along with a request for the decryption key.

Figure 12:
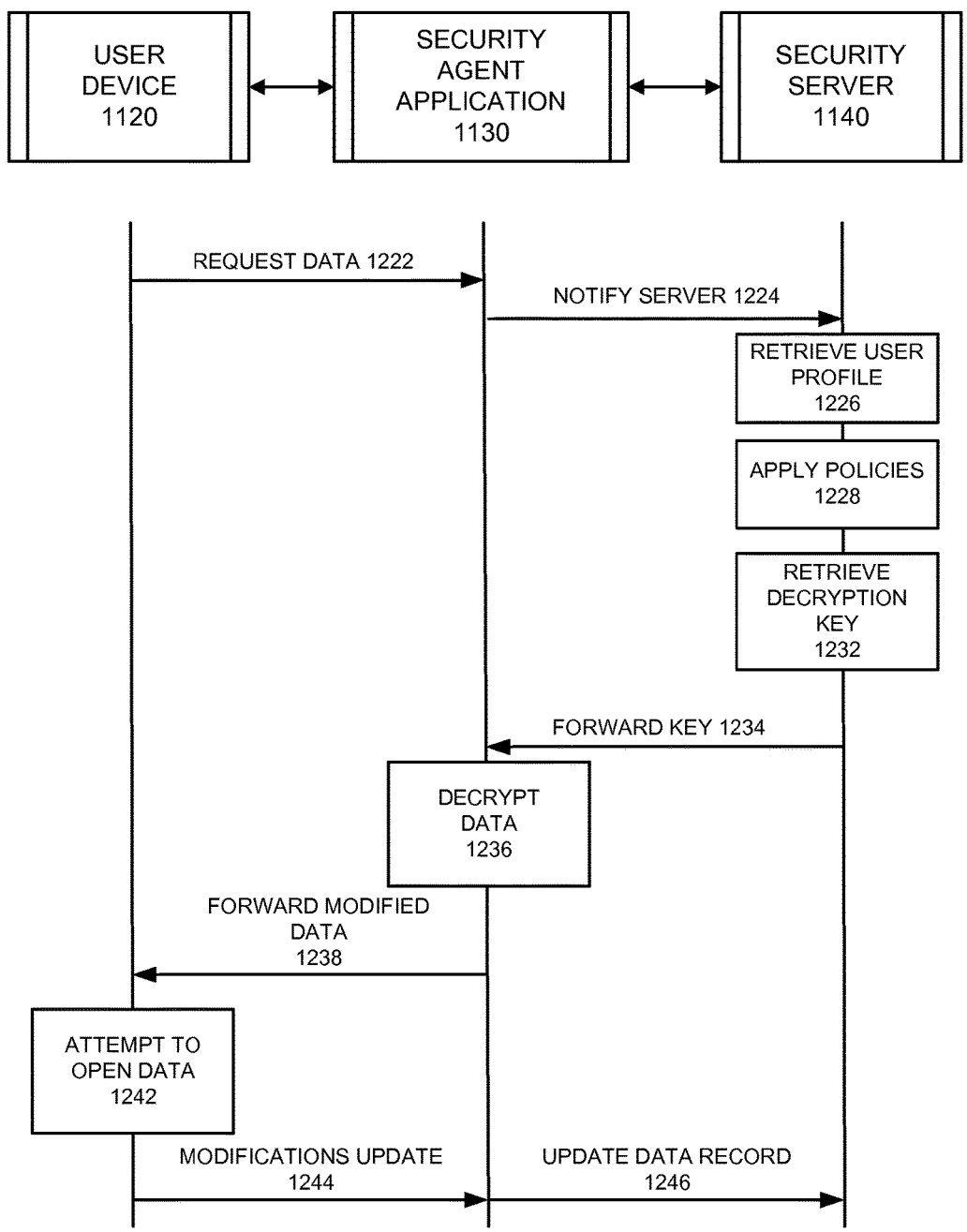
FIG. 12 illustrates an example system communication diagram of a procedure for accessing secured data according to example embodiments.

FIG. 12 illustrates an example system communication diagram 1200 of a procedure for accessing secured data according to example embodiments. Referring to FIG. 12, the user device 1120 may be operating a security management application agent 1130 that communicates with a remote server 1140. In operation, a user may request data 1222 and the agent application may notify 1224 the server of the user device activity and desire to access particular secure data. The server may then retrieve a user profile 1226 associated with the user device and apply policies 1228 to the data based on the user profile of known rights to that particular data. The server may then retrieve 1232 a decryption key that can be used to decrypt the data of interest. The key may then be forwarded 1234 to the user application which manages the data decryption process 1236. The modified data 1238 may then be forwarded to the user device for review or to another user device as a link, email or other accessible format. The user device may then attempt to open the data 1242 and the user credentials may be identified and transmitted to the application. Also, any modifications may be updated to the server 1244 and the record for the data may be updated 1246 to reflect such changes.

Figure 13:
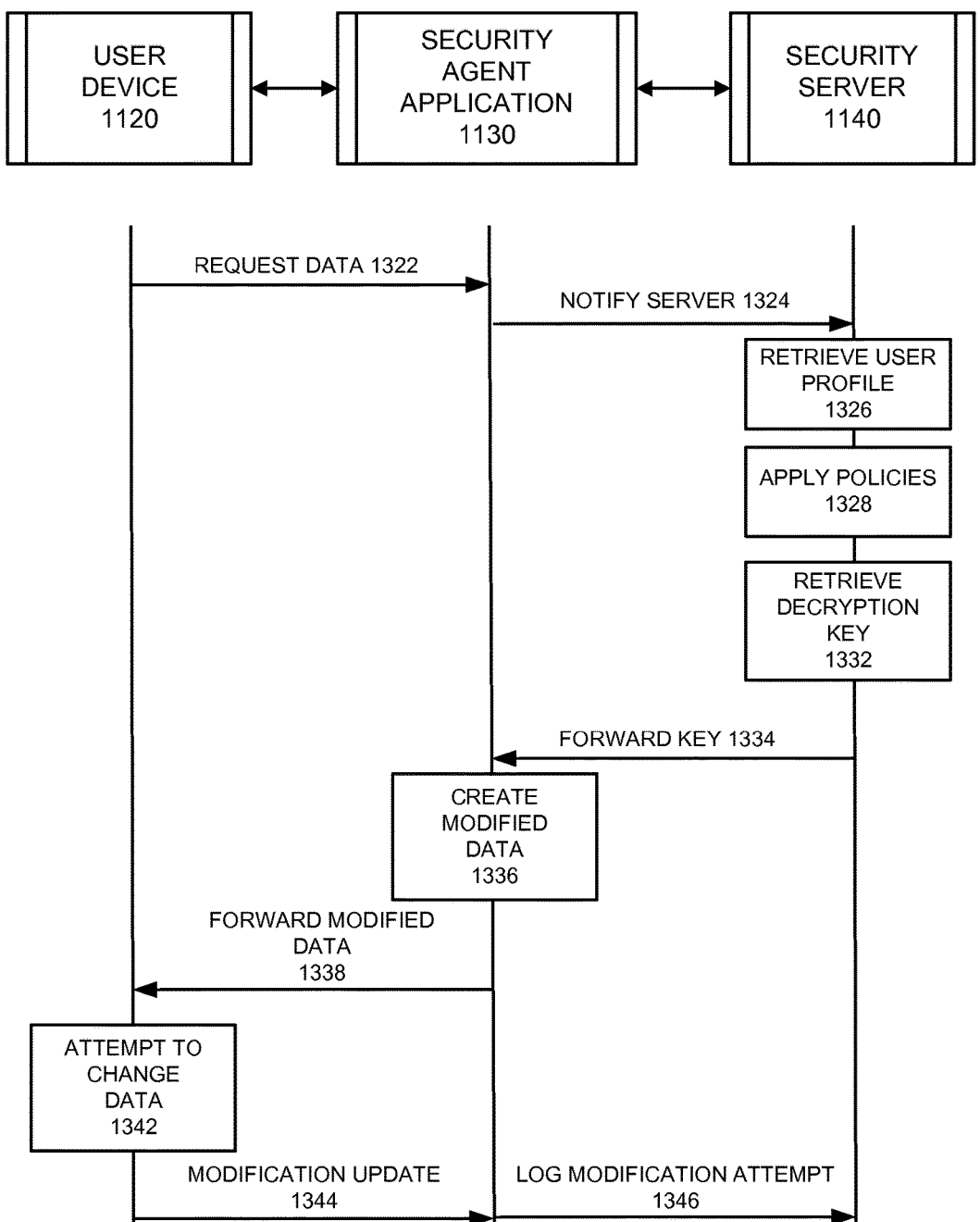
FIG. 13 illustrates an example system communication diagram 1300 of a procedure for managing secured data according to example embodiments.

FIG. 13 illustrates an example system communication diagram 1300 of a procedure for managing secured data according to example embodiments. Referring to FIG. 13, the user device 1120 may be operating a security management application agent 1130 that communicates with a remote server 1140. In operation, a user may request particular data 1322 and the agent application may notify 1324 the server of the user device activity and desire to access particular secure data. The server may then retrieve a user profile 1326 associated with the user device and apply policies 1328 to the data based on the user profile of known rights to that particular data. The server may then retrieve 1332 a decryption key that can be used to decrypt the data of interest. The key may then be forwarded 1334 to the user application which manages the data decryption process 1336. The modified data 1338 may then be forwarded to the user device for review or to another user device as a link, email or other accessible format. The user device may then attempt to change the data 1342 and the user credentials may be identified and transmitted to the application. Also, any modifications may be updated to the server 1344 and the log for the data may be updated 1346 to reflect such changes.

According to example embodiments, a policy can be applied to data to permit an end user or an administrator to secure data from both access control as well as data loss prevention to control what a user can and cannot do with the data, and the ability to change a policy in real-time. In one example, the data can be a remotely stored document or other data type that is viewed from a browser, such as a GOOGLE document which is visible on an end-point device. The policy applied to the data may be data access, data view, data edit, data modify, etc., to be applied in perpetuity or for a specific period of time. Also, the policy can be set remotely and in real-time. Policies can be applied "dumb bulk" via manual action by an administrator to set the policy (i.e. check on various data and set policy) and "intelligent bulk" where the administrator is pointing to a file server. Searching for a pattern that looks like a social security number, the administrator can lock down the file for any viewing capability, encrypt those files, etc.), can set automated rules (if a data set is dragged and dropped to a location, such as cloud storage, then policy is automatic for that data).

In order to distinguish between protected and non-protected data sets. The restriction of copying data from protected to non-protected may include the application agent operating in the shim between the OS and data. In operation, the user tries to copy and paste and this action is intercepted and sent to the OS, a policy is checked to see if it is allowed for that user and for that document. This can happen within data in a single document where some data in document is permitted to be copied and some data in the document is not permitted. The policy would have to be set for this and can be different for different users and/or different documents.

Figure 14:
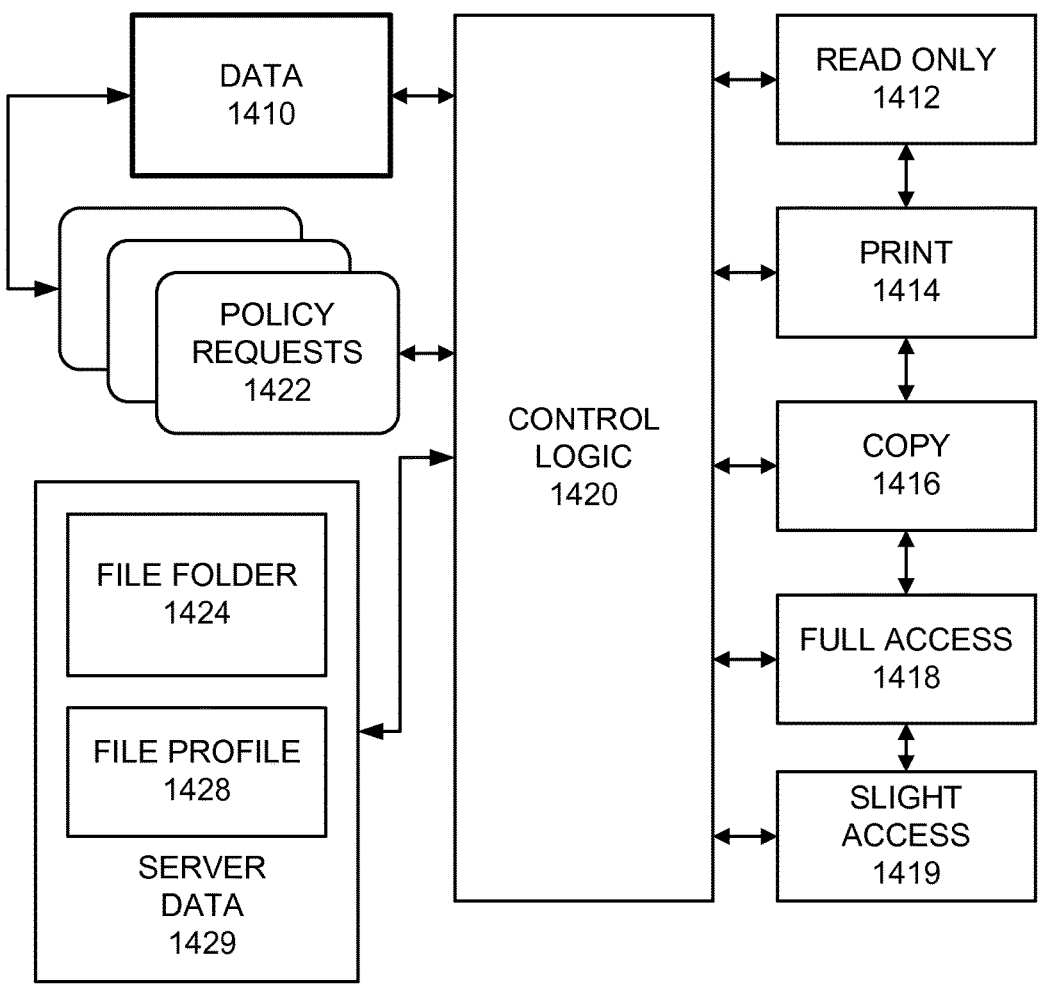
FIG. 14 illustrates a logic diagram 1400 that includes various inputs and outputs which are part of the processing procedures according to example embodiments.

Examples of supported file types may include MICROSOFT OFFICE, WORD, PHOTO VIEWER, MEDIA PLAYER, POWERPOINT, EXCEL, OUTLOOK, APPLIE MAIL, ADOBE ACROBAT/READER, QUICKTIME, APPLE PREVIEW, etc. The policies may include edits, save as, printing, copy/paste, offline access, timeout and authentication, require authentication, watermark, X-Ray, one-time view, time bomb duration, etc. Also, there are three states of copy/paste restrictions including 'Disabled' which does not provide any option to access such features as copy/paste, and 'secure docs only' which permits the action but immediately encrypts the data. Copied content is encrypted in pasteboard and flagged as protected content. Copied content can only be decrypted by another secure document. With 'All Docs' the copied content is not encrypted or flagged in the pasteboard FIG. 14 illustrates a logic diagram 1400 that includes various inputs and outputs which are part of the processing procedures according to example embodiments. Referring to FIG. 14, the input parameters may include the data 1410, the policy requests to be instilled on the data, and server information including a data identifier, folder 1424, profile 1428 and other server data 1429. The control logic may then utilize those inputs to create data with certain outputted policies including but not limited to read only 1412, print 1414, copy 1416, full access 1418 and slight access or limited access 1419 which limits the ability for a user to view the data at all.

One example embodiment provides a document security initiation procedure. An example method may include at least one of selecting data via a computing device and transmitting a message from the computing device to a server identifying the data and receiving an encryption key from the server, modifying a file type of the data and encrypting the data contents. The method may also include applying at least one policy to the data, and transmitting an updated message to the server identifying the modified document.

Another example embodiment may include a data access operation. The method corresponding to such an example includes at least one of selecting data via a computing device, transmitting a message from the computing device to a server identifying the data and a user profile associated with the computing device, verifying access rights for the data based on the user profile, receiving an decryption key from the server, and decrypting the data with the decryption key and receiving restricted access to the data based on a policy identified in the user profile.

Another example embodiment may include a server operating in an access scenario which may include a method that includes at least one of receiving a request message to access data from a computing device, identifying a user profile from the request message, retrieving at least one policy stored in the user profile, transmitting a response message including a decryption key to the computing device, receiving a confirmation message that the data has been accessed, and monitoring the computing device during access of the data.

Another example embodiment may include data with multiple levels of security. The method may include at least one of receiving a request message for access to a data, identifying a user profile from the request message, retrieving at least one policy stored in the user profile, identifying a plurality of different security levels associated with the document, transmitting a response message comprising a decryption key to the computing device, receiving a confirmation message that the document has been accessed, and providing limited access to the computing device to perform at least one of view and modify the data.

Any or more of the above-noted operations and/or processes may be performed via an APPLE IOS operating system, an ANDROID operating system, a MICROSOFT operating system, a LINUX operation system, etc. The devices which utilize the above-noted operations may be any device that is capable of processing data via one or more native processors or via access to a processing platform including but not limited to appliances, tablets, cellular phones, smartphones, laptops, personal computers, servers, servers in the cloud, virtual machines, hypervisors, distributed networks, etc. Also, the communication among devices may be any of the known communication standards, such as IEEE 802.11 communication protocols and/or cellular 3G/4G, LTE, PCS communication protocols. Data may be shared between the various operating system platforms as well and may be protected/encrypted based on the above-noted examples or in a hybrid operating system configuration among two more devices, such as ANDROID/IOS ANDROID/ANDROID, ANDROID/WINDOWS, etc. Documents, messages, data input, data saved, data stored, etc., may be candidate data for protection services on any of the above-noted platforms or combinations thereof.

Figure 15A:
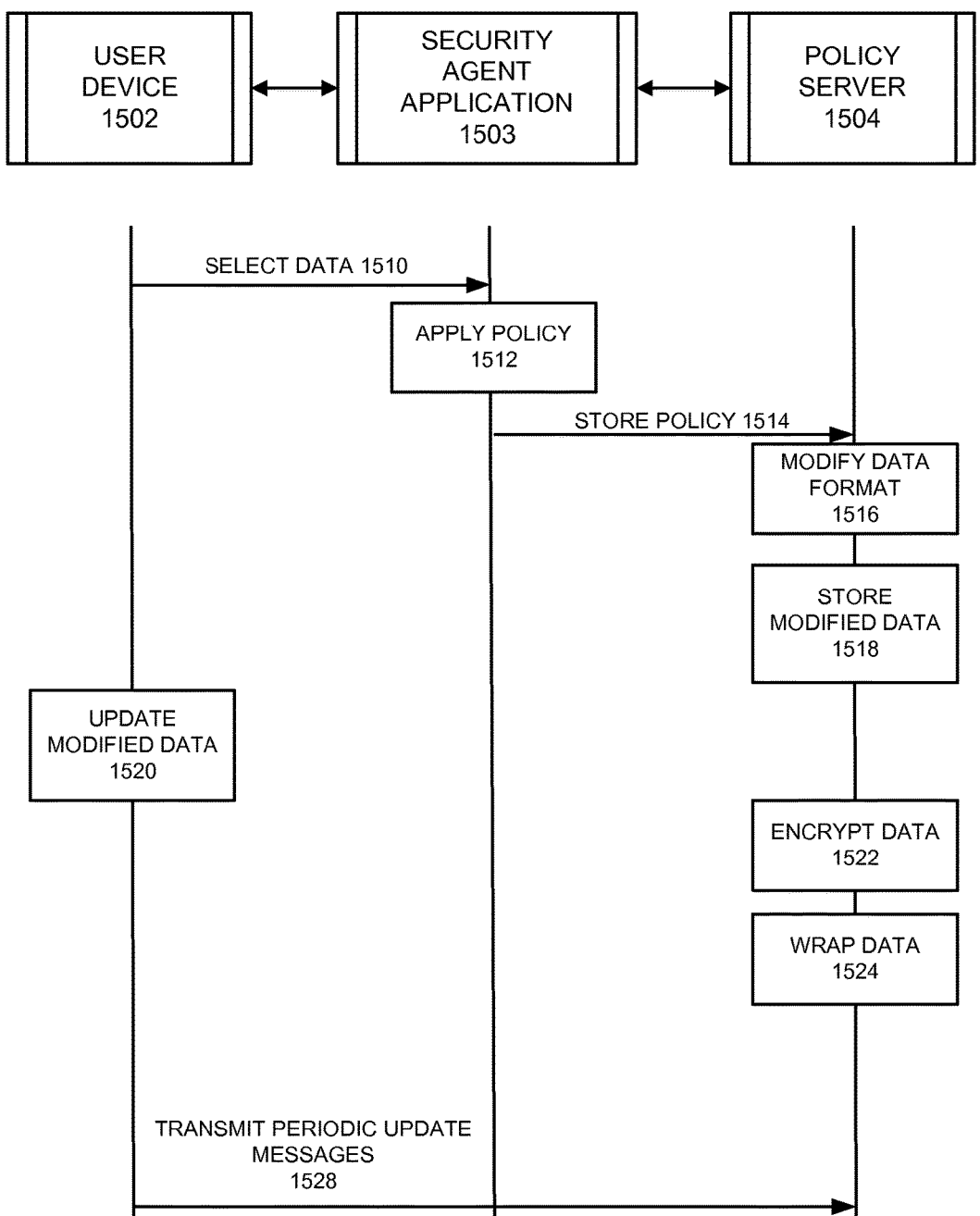
FIG. 15A illustrates an example system diagram of a data securing procedure according to example embodiments.

FIG. 15A illustrates an example system diagram of a data securing procedure according to example embodiments. Referring to FIG. 15A, one example method of operation may include a user device 1502 selecting data to be protected as operated by a security agent application 1503 which may be installed on the user device 1502 and/or a remote storage and policy server 1504. The method may include selecting data to secure and applying at least one policy to the data 1512. The policy may be a level of security that is either applied to one or more user profiles or restricts certain users depending on their viewing privileges. The data may be stored 1514 in the policy server 1504 and retrieved upon request and confirmation of user profile privileges associated with the requesting user device. The policies applied to the data may be stored in metadata, a data record profile associated with the data or a data record table.

Once the data is tagged to be secure, the format of the data may change. For example, if the data was part of a particular file format, such as a WORD document or PDF type document, the data may be encrypted, converted to HTML or other file formats 1516 and stored in memory as modified data 1518. During subsequent operations, the data may be updated and/or modified 1520 by adding new content, removing content, saving the data to a particular location, etc. All the updates may be shared with the policy server 1504 so the metadata and/or data profile may be updated to reflect the changes, the time, the user device and account that made the update, etc. Periodic messages may be transmitted to the policy server 1504 to update the data record to include the updates to the modified data. When the data is secured, the data may be encrypted 1522, wrapped in a file format 1524 that is intelligible to a user of the user device even though the actual data format is different from the file wrapper format (e.g., HTML actual format vs. PDF wrapper format). The update to the data record includes metadata including at least one of user identification and a policy associated with the update. The wrapper may include the metadata or other portions of the data may be used to store the metadata. Changes to the data may be shared with the policy server 1504 via periodic update messages 1528. Also, the encrypting of the data may be performed responsive to applying the at least one policy, and wrapping the data via a file format different from a file format of the data after encrypting the data. In general, the data may be associated with any file type, however, modifying the file format of the data to a web browser compatible format may provide ease of access when receiving an encryption key to decode the data and to monitor the data via the policy server.

The policy server does not typically store the data or any files associated with the data being accessed. Instead the policy server acts as a mediator to provide policy information, keys to access the protected data and a monitoring service when the data needs to be monitored. In operation, a first user will share protected data with another user via email, etc., and the second user will attempt to access the data. The protected data/file status will automatically alert the policy server for policy information and user policy rights. When it is determined the protected data has a policy and the user has access, then the user device will be permitted to authenticate itself and receive a key from the server to access the encrypted data.

Figure 15B:
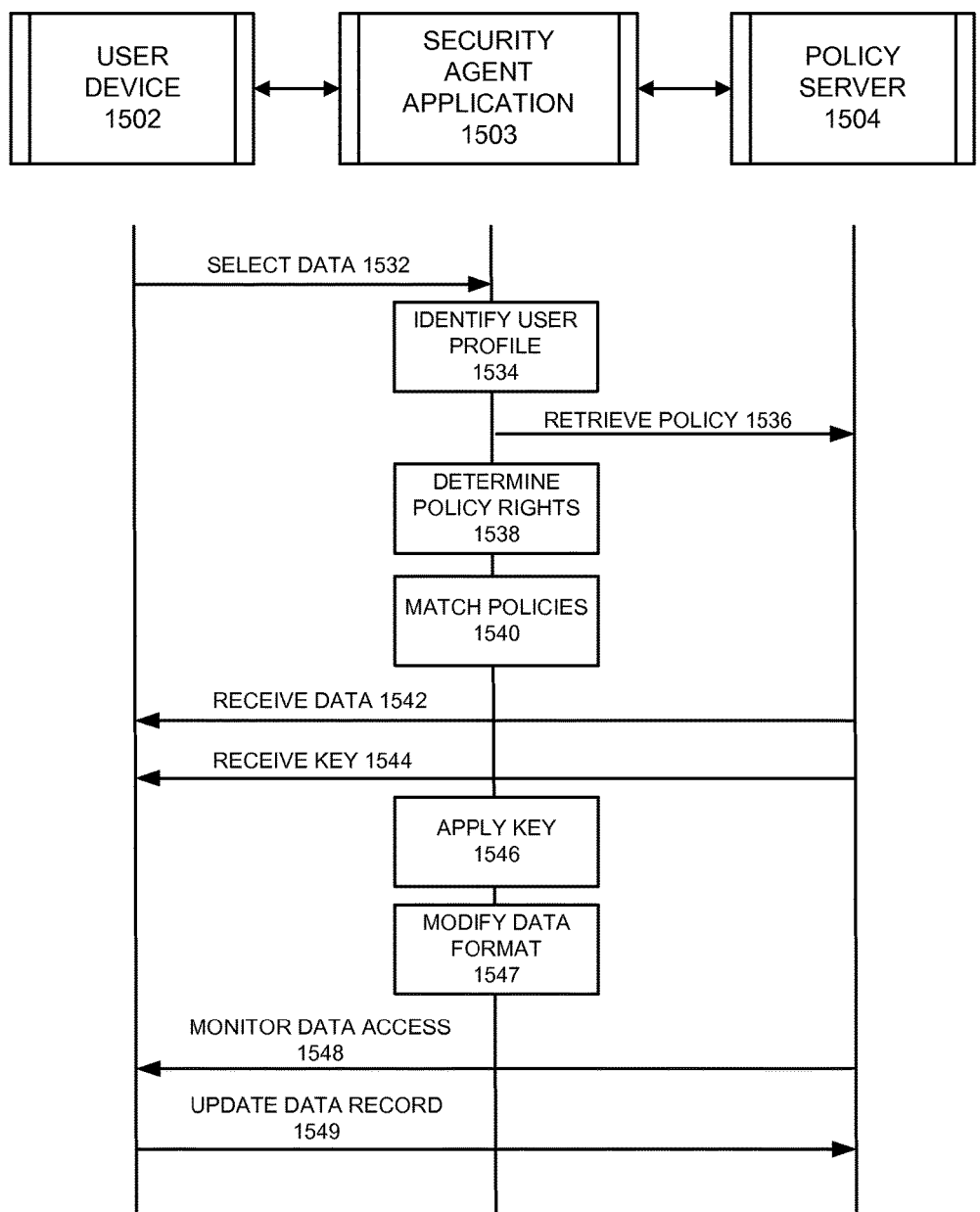
FIG. 15B illustrates an example system diagram of a data access procedure according to example embodiments.

FIG. 15B illustrates an example system diagram of a data access procedure according to example embodiments. Referring to FIG. 15B, the example 1520 may include selecting data 1532 to access via a user device 1502, identifying a user profile 1534 of the user device and then retrieving the policies 1536 which are provided to that user device. The policies and rights are then determined as certain degrees of access, including a scale of 1-5, full, partial, none, etc., depending on the preferred approach to limiting/providing access to the data. Whatever policies 1538 are applied to the user profile must be matched 1540 to the policies associated with the data attempted to be accessed. If the user profile does not contain a sufficient privilege policy level that is at least as comparable as the data policy, the user device will not receive access. After the user assigned policy has been approved to view the secured data, the data may be received 1542 as an encrypted data format or document and an encryption key 1544 may be transmitted from the server 1504 to the user device to access the data. Once the key is applied 1546, the file format of the data may be modified to a different and secure format 1547 that can provide document access in a web browser or other data viewing tool. During the data access operation, the policy sever 1504 may periodically monitor the data and whether changes are made on an ongoing basis 1548. The data record 1549 can be updated and the changes may be stored in the policy server in the form of an updated data set and/or metadata identification of the changes.

Figure 15C:
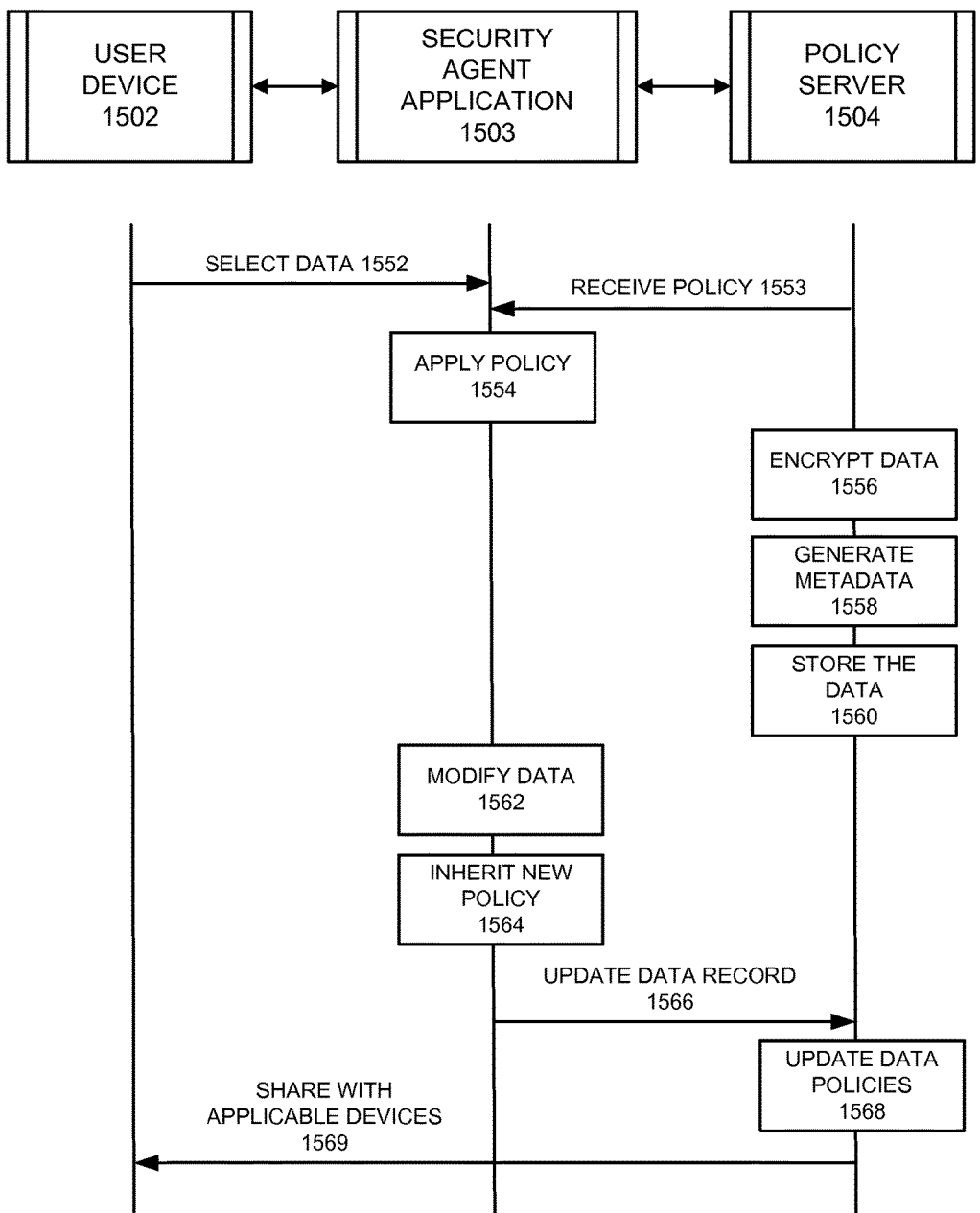
FIG. 15C illustrates an example system diagram of a data policy creation and enforcement procedure according to example embodiments.

FIG. 15C illustrates an example system diagram of a data policy creation and enforcement procedure according to example embodiments. Referring to FIG. 15C, the user device 1502 may be selecting data to access 1552 in which case, the policy or policies may be applied 1554 as received from the policy server 1553. The server 1504 may encrypt the data 1556, generate metadata 1558 and store the data 1560 to reflect the recently applied policy. Thereafter, the data can be modified 1562 by any user device that has access to the data. Each modification by each user device may cause the data to inherit a new policy 1564 at least with respect to the portion of data modified. The data record may be updated 1566 and the updated data policies 1568 can be stored in the policy server for subsequent access operations. The updated data can then be shared 1569 with all the devices which are privileged to view the data depending on the policy.

The process of pairing the metadata with the data includes creating a file wrapper with a pointer or link that is linked to a location the data is stored. The file wrapper may indicate a file type that is different from an actual file type of the data, such as indicating the data is a pdf file format when the actual data file is HTML. The next modification to the data may cause the data to inherit a new policy based on a modification to the data by at least one user device having privileges to access the data. The modification to the data may include changing a policy, adding a policy, removing a policy, adding additional data to the data, removing at least a portion of the data, and modifying a storage location of the data. Thereafter a different device may seek access to the data and the data may be transmitted to at least one additional user device responsive to receiving a request for the data, and at least one additional policy can then be applied to the data corresponding to a user profile of the at least one additional user device. The user policy may include limited access to the data including at least one of read only data, no saving capability, no writing to data, and limited viewing capability.

Figure 15D:
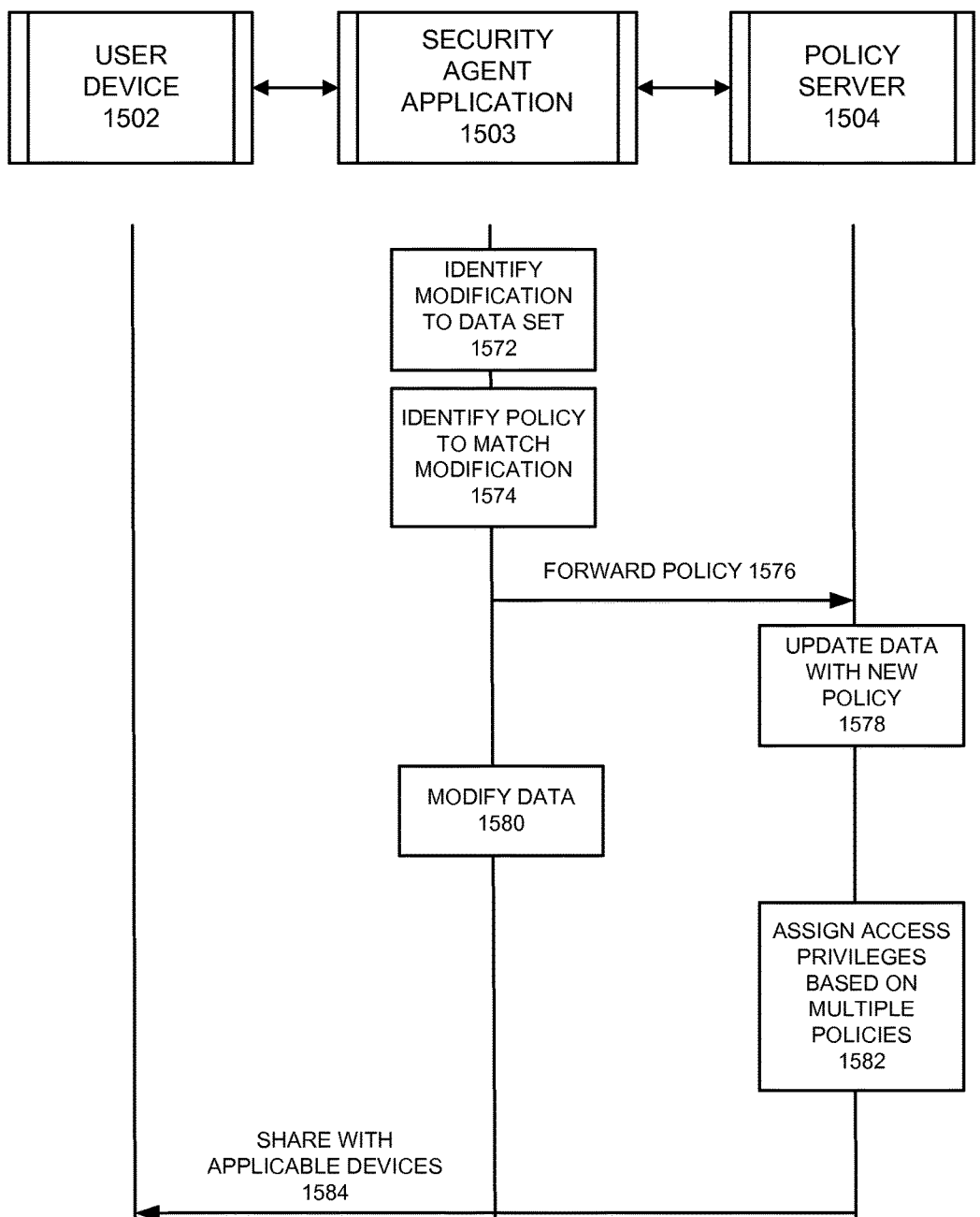
FIG. 15D illustrates an example system diagram of a data set creation and sharing procedure according to example embodiments.

FIG. 15D illustrates an example system diagram of a data set creation and sharing procedure according to example embodiments. Referring to FIG. 15D, the example configuration of 1570 may include identifying a modification 1572 to a set of data performed by a user device 1502. The set of data may include a document with various different data portions or data segments each of which have varying authors, varying policies, etc., however, each of the data portions may be part of a larger data set or document all tied together by a saved file format or other data set combination known to those skilled in the art. The policy that matches the modification 1574 can be identified and shared with the policy server to update the data and the data record/metadata that tracks the policy changes. The determining of the one or more policies to apply to the modified portion of the set of data is based on a type of modification performed to the data and/or the user profile associated with the user device that actually made the changes. For example, the change may have included deleting high priority or important level policy data in which case the user profile must have had such rights to perform that operation along with the policy linked to the actual data that was removed. The policy may be applied to the modified portion of the set of data that limits access to the modified portion of the set of data to user profiles assigned privileges to the at least one policy.

The policy may be forwarded 1576 to the policy server 1504 where it can be updated with the data 1578. The data may then be modified 1580. The data may be a set of data that includes a number of data portions at least two of which were modified by different user profiles having different policies applied to the respective at least two data portions. This means some of the data in the data set will be viewable by certain user devices while not viewable by other user devices. At least one of the two data portions will have a stricter data access policy than the other of the at least two data portions thereby limiting the viewing capabilities of at least one user device. The privileges can be assigned to include multiple policies 1582 and then shared with various devices 1584 depending on the policies of those devices registered on the policy server 1504.

In this example, a first user device assigned a first policy may be permitted to view all the data portions of the document, and a second user device assigned a second policy may be permitted to view only a subset of the data portions of the document, and access to the remaining data portions of the document may be restricted. The type of modification applied to the portion of the set of data can be determined automatically based on a degree of importance assigned to a project linked to the set of data. For instance, if the user device is operating within a project folder or file name and that project is marked important or unimportant, the policy server 1504 can make changes to the policies accordingly without user selections being required. Determining a policy to apply to the modified portion can be based on the user profile associated with the user device by retrieving the user profile and identifying the policies assigned to the user device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 16 illustrates an example network element 1600, which may represent any of the above-described network components of the other figures.

Figure 16:
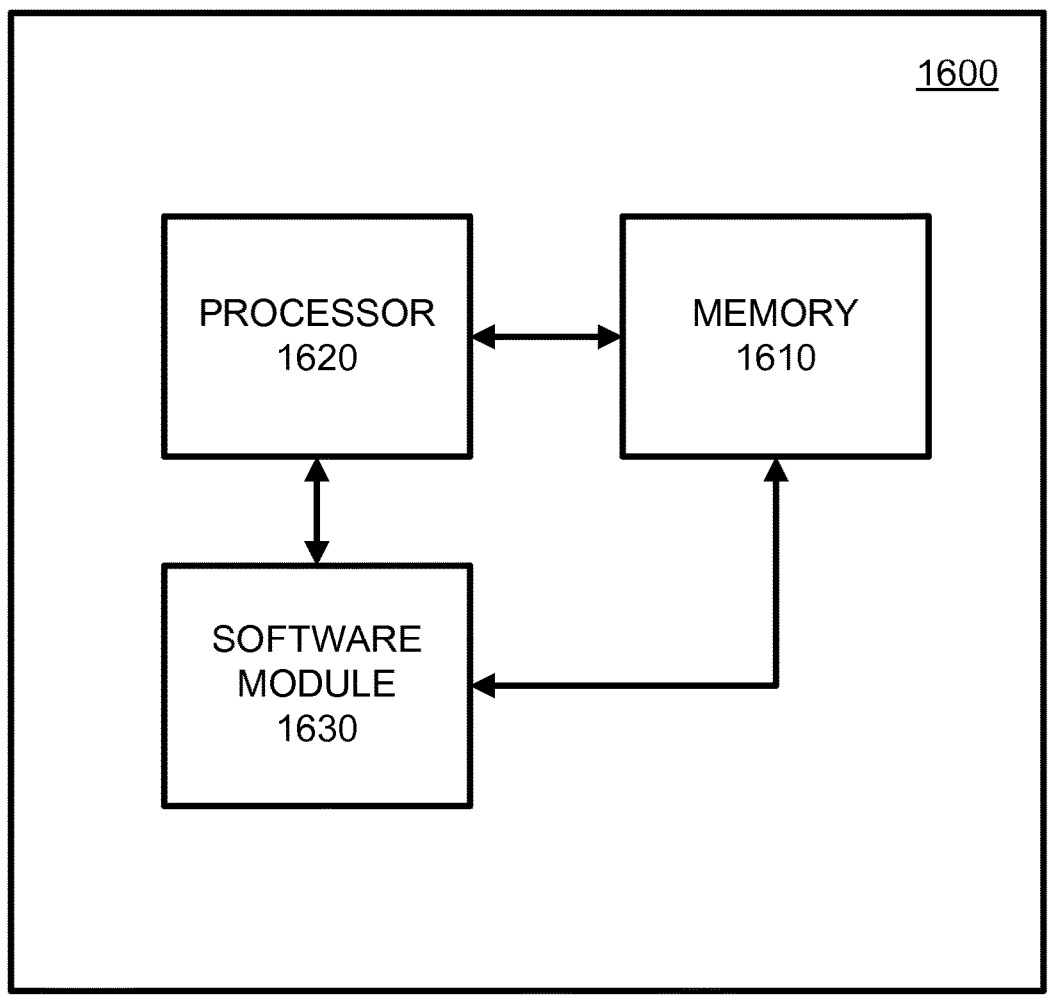
FIG. 16 illustrates an example network entity device configured to store instructions, software, and corresponding hardware for executing the same, according to example embodiments of the present application.

As illustrated in FIG. 16, a memory 1610 and a processor 1620 may be discrete components of the network entity 1600 that are used to execute an application or set of operations. The application may be coded in software in a computer language understood by the processor 1620, and stored in a computer readable medium, such as, the memory 1610. The computer readable medium may be a non-transitory computer readable medium that includes tangible hardware components in addition to software stored in memory. Furthermore, a software module 1630 may be another discrete entity that is part of the network entity 1600, and which contains software instructions that may be executed by the processor 1620. In addition to the above noted components of the network entity 1600, the network entity 1600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:

selecting data to access by a user via a user device, wherein an application stored on the user device notifies a remote server that the data will be secured;

determining, by the remote server, whether at least one user policy permits the user device to access the data, wherein the at least one user policy further provides one or more of editing rights, saving rights, printing rights, copying rights, pasting rights, offline access rights, watermark access rights to an otherwise obstructed view, x-ray access rights to an otherwise limited view, a one-time view rights, a time bomb duration right to view the data within a time window prior to the rights self-destructing when the time window expires;

applying an encryption key to the data;

wrapping the data by the application in a HTML shell, wherein the data is configured to be accessed and decrypted in a web browser in the user device and responsive to the data being accessed or decrypted, time stamping the data, and wherein the wrapped data is represented in a wrapped data format as an icon or logo of an original unsecured data format that includes HTML data and metadata;

transmitting the wrapped and encrypted data to the user device;

transmitting a request to the application to decrypt the encrypted data; and unwrapping, by the application, the data from the wrapped data format to access the data.

2. The method of claim 1, wherein the data selected is stored in a document format.

3. The method of claim 1, further comprising:
identifying, by the remote server, the user profile associated with the user device; and
retrieving, by the remote server, the at least one user policy associated with the user profile; wherein the user profile is stored on a policy server.

4. The method of claim 1, further comprising monitoring the data accessed by the user device via the policy server.

5. The method of claim 1, further comprising updating a data record associated with the data to log changes to the data performed via the user device.

6. The method of claim 1, further comprising modifying a file format of the data by changing the file format to a web browser accessible format.

7. The method of claim 6, wherein the web browser accessible format is hyper-text markup language (HTML) format.

8. An apparatus, comprising:
a processor device configured to
select data to access via a user device, wherein an application stored on the user device forwards an indication to secure the data;
determine whether at least one user policy permits the user device to access the data, wherein the at least one user policy further provides one or more of edit rights, save rights, print rights, copy rights, paste rights, offline access rights, watermark access rights to an otherwise obstructed view, x-ray access rights to an otherwise limited view, a onetime view rights, a time bomb duration right to view the data within a time window prior to a self-destruct of the rights when the time window expires; apply an encryption key to the data;
wrap the data by the application in a HTML shell, wherein the data is configured to be accessed and decrypted in a web browser in the user device and responsive to the data being accessed or decrypted, time stamp the data, and wherein the wrapped data is represented in a wrapped data format as an icon or logo of an original unsecured data format that includes HTML data and metadata;
forward a request to the application to decrypt the encrypted data; and unwrap by the application, the data from the wrapped data format to access the data; and
a receiver device configured to receive the wrapped and encrypted data at the user device.

9. The apparatus of claim 8, wherein the data selected is stored in a document format.

10. The apparatus of claim 8, wherein the processor is also configured to:
identify the user profile associated with the user device; and
retrieve the at least one user policy associated with the user profile;
wherein the user profile is stored on a policy server.

11. The apparatus of claim 8, wherein the processor is also configured to monitor the data accessed by the user device via the policy server.

12. The apparatus of claim 8, wherein the processor is further configured to update a data record associated with the data to log changes to the data performed via the user device.

13. The apparatus of claim 8, wherein the processor is also configured to modify a file format of the data by a change to the file format to a web browser accessible format.

14. The apparatus of claim 13, wherein the web browser accessible format is hyper-text markup language (HTML) format.

15. A non-transitory computer readable storage medium configured to store instructions that when executed causes a processor to perform:
selecting data to access by a user via a user device, wherein an application stored on the user device notifies a remote server that the data will be secured;
determining, by the remote server, whether at least one user policy permits the user device to access the data, wherein the at least one user policy further provides one or more of editing rights, saving rights, printing rights, copying rights, pasting rights, offline access rights, watermark access rights to an otherwise obstructed view, x-ray access rights to an otherwise limited view, a one-time view rights, a time bomb duration right to view the data within a time window prior to the rights self-destructing when the time window expires;
applying an encryption key to the data;
wrapping the data by the application in a HTML shell, wherein the data is configured to be accessed and decrypted in a web browser in the user device and responsive to the data being accessed or decrypted, time stamping the data, and wherein the wrapped data is represented in a wrapped data format as an icon or logo of an original unsecured data format that includes HTML data and metadata;
transmitting the wrapped and encrypted data to the user device;
transmitting a request to the application to decrypt the encrypted data; and
unwrapping, by the application, the data from the wrapped data format to access the data.

16. The non-transitory computer readable storage medium of claim 15, wherein the data selected is stored in a document format.

17. The non-transitory computer readable storage medium of claim 15, wherein the processor is further configured to perform:
identifying, by the remote server, the user profile associated with the user device; and
retrieving, by the remote server, the at least one user policy associated with the user profile; wherein the user profile is stored on a policy server.

18. The non-transitory computer readable storage medium of claim 15, wherein the processor is further configured to perform monitoring the data accessed by the user device via the policy server.

19. The non-transitory computer readable storage medium of claim 15, wherein the processor is further configured to perform updating a data record associated with the data to log changes to the data performed via the user device.

20. The non-transitory computer readable storage medium of claim 15, wherein the processor is further configured to perform modifying a file format of the data by changing the file format to a web browser accessible format.

* * * * *